(12) United States Patent
Yu et al.

(10) Patent No.: US 9,706,188 B2
(45) Date of Patent: Jul. 11, 2017

(54) BINOCULAR CAMERA RESETTING METHOD AND BINOCULAR CAMERA RESETTING APPARATUS

(71) Applicants: Shenzhen Mercury Optoelectronics Research Institute, Shenzhen, Guangdong (CN); SUPERD CO. LTD., Shenzhen, Guangdong (CN)

(72) Inventors: Shuda Yu, Guangdong (CN); Rui Wang, Guangdong (CN)

(73) Assignees: Shenzhen Mercury Optoelectronics Research Institute, Shenzhen, Guangdong (CN); SUPERD CO. LTD., Shenzhen, Guangdong (CN)

( * ) Notice: Subject to any disclaimer, the term of this patent is extended or adjusted under 35 U.S.C. 154(b) by 379 days.

(21) Appl. No.: 14/488,442

(22) Filed: Sep. 17, 2014

(65) Prior Publication Data

US 2015/0181199 A1    Jun. 25, 2015

(30) Foreign Application Priority Data

Dec. 25, 2013   (CN) .......................... 2013 1 0728399

(51) Int. Cl.
   *H04N 13/02*   (2006.01)
(52) U.S. Cl.
   CPC .............................. *H04N 13/0246* (2013.01)

(58) Field of Classification Search
   CPC ................................................... H04N 13/0246
   USPC ........................................................... 348/47
   See application file for complete search history.

(56) References Cited

U.S. PATENT DOCUMENTS

| | | | |
|---|---|---|---|
| 2011/0261167 A1* | 10/2011 | Shin ................... | H04N 13/0239 348/47 |
| 2012/0162454 A1* | 6/2012 | Park ...................... | H04N 5/145 348/208.6 |
| 2014/0118503 A1* | 5/2014 | Luo .................... | H04N 13/0246 348/47 |

* cited by examiner

*Primary Examiner* — Nguyen Truong
(74) *Attorney, Agent, or Firm* — Andrew C. Cheng

(57) ABSTRACT

The present invention provides a binocular camera resetting method and a binocular camera resetting apparatus, wherein the binocular camera resetting method comprises: obtaining a first image and a second image photographed by two cameras at the same time respectively after completing a rough adjustment of the two cameras; calculating a relative rotation angle between optical axes of the two cameras using a plurality of feature points of the first image acquired by one of the two cameras and the feature points of the second image acquired by the other one of the two cameras; controlling one of the two cameras to rotate the relative rotation angle to parallelize the optical axes of the rotated camera and the other camera; and adjusting a spaced distance between the two cameras to a preset distance.

16 Claims, 10 Drawing Sheets

BINOCULAR CAMERA RESETTING METHOD AND BINOCULAR CAMERA RESETTING APPARATUS

FIELD OF THE INVENTION

The present invention relates to technical field of stereoscopic image photographing, and more particularly to a binocular camera resetting method and a binocular camera resetting apparatus.

BACKGROUND OF THE INVENTION

Binocular camera is a commonly used photographing tool when photographing a three-dimensional film or video. Recently, a movable binocular camera, i.e. binocular camera having left and right cameras that can freely rotate or horizontally move, appears and offers more feasibility for photographing. By using this kind of camera, a photographer can make suitable adjustment to parameters of the camera (spaced distance and related rotating angle between left and right cameras) according to the scene in order to obtain ideal stereo display effect.

During photographing, the movable binocular camera is at an original position in the beginning, and then the camera participates in photographing. After photographing, the binocular camera should be reset to the original position in order to be used next time because the parameters of the camera have been changed during photographing. It is very important to reset the camera to the original position precisely. A binocular camera at the original position at least has the following features: the left and right cameras are precisely aligned and the optical axes are parallelized; the spaced distance there between is known. By using cameras under this condition, there is only parallax difference existed in the left and right images obtained there from. The photographer can precisely adjust the parameters of the cameras according to the position only when the cameras are at the position. Assuming that the movable binocular camera is not reset to the original position, such as the left and right cameras cannot be aligned precisely, there will be error in the parallax calculation of the photographed film or video such that the stereo effect of the film or video is reduced.

Nowadays, there are two reset adjusting methods as follows:

1. The photographer makes the adjustment manually according to experience, and determines whether the cameras are reset.

2. The adjustment data made each time are recorded, and every adjustment is made reversely according to the recorded adjustment data after completing photographing.

However, there are drawbacks existed in the above two methods. The former method cannot ensure that the adjustment is precise, and the speed is slow. The latter method results in increasing difference between the real original position and the precision original position due to accumulation of error generated by each adjustment, and when an external force disturbs, such as the cameras tossed, the error would be uncontrollable. Besides, position detecting sensors can be used for determining whether the camera is at the original position. However, there is error existed in the sensors so that the left and right cameras cannot be aligned precisely and precise sensors may highly increase the price of the apparatus Therefore, solving technical problem of precisely resetting the movable binocular camera to the original position is urged.

SUMMARY OF THE INVENTION

Based on at least one of the problems mentioned above, the present invention provides a new camera resetting technology which determines related angles between optical axes of the binocular camera and the spaced distance between two cameras by using computer vision technology without manual adjusting or sensor-based adjusting.

According to one aspect of the present invention, there provides a binocular camera resetting method comprising: obtaining a first image and a second image photographed by two cameras at the same time respectively after completing a rough adjustment of the two cameras; calculating a relative rotation angle between optical axes of the two cameras using a plurality of feature points of the first image acquired by one camera and the feature points of the second image acquired by the other camera; controlling one of the two cameras to rotate the relative rotation angle to parallelize the optical axes of the rotated camera and the other camera; and adjusting a spaced distance between the two cameras to a preset distance in order to ensure that the two cameras are at a preset original position after parallelizing the optical axes of the two cameras.

When resetting the binocular camera, the two cameras are roughly adjusted firstly. The rough adjusting might adopt the reset adjusting methods nowadays, such as manual adjusting method or method of checking by sensor or inversely applying the translation operations using recorded data. Because the cameras do not reach the precision original position, the technical solution mentioned above obtains angle between the optical axes of the two cameras by computer vision technology, and adjusts the binocular camera pose based on the calculated angle for placing the binocular camera at the ideal original position in order to prevent from the error generated by the reset adjusting method nowadays.

In order to make the binocular camera reach the precision original position, the distance between the two cameras should be a preset distance besides the optical axes of the two cameras should be parallel. By doing so, there is only parallax between the left and right images photographed by the binocular camera. Since errors generated by manual adjusting and sensor checking are avoided, the stereo video effect obtained by the binocular camera using the resetting method could be better.

It is better in the above technical solution that calculating the relative rotation angle between optical axes of the two cameras using feature points of the first image acquired by one camera and the feature points of the second image acquired by the other camera comprises: detecting a plurality of feature points of the first image and a plurality of feature points of the second image, respectively; matching the feature points of the first image and the feature points of the second image to obtain a plurality of feature point matching pairs; and calculating the relative rotation angle according to the feature point matching pairs.

The present invention obtains related angles between the optical axes of the two cameras by computer vision technology. There are several ways to calculate the angle. In a better embodiment, the feature points of the left and right images are detected, and the amount of the feature points can be preset. The feature points of the left and right images are then matched to obtain a plurality of matching pairs. The relative rotation angle can be calculated by using these matching pairs. The angle calculating procedure is performed by using images photographed by the left and right cameras without sensors, so that the error generated by the sensor can be avoided.

It is better in any one of the technical solutions above that detecting the feature points of the first image and the feature points of the second image, respectively comprises: calculating a pixel feature score of each pixel in each of the images; and selecting a predetermined amount of pixels each with pixel feature score greater than a threshold to be the feature points of each of the images; wherein matching the feature points of the first image and the feature points of the second image comprises: for each feature point of the first image, calculating its matching scores with all its neighbor feature points in the second image; and selecting the feature point with the highest matching score as the matched feature point.

It is necessary for calculating pixel feature score of each pixel and then selecting the pixel with pixel feature score greater than a threshold as a feature point when detecting the feature points of the image. That is, feature pixels are selected from each image such that calculation time needed thereafter can be reduced. After that, the feature points of the left and right images are matched and matching value (i.e. degree of matching) of each matching pair is calculated. The higher the matching value is, the higher the possibility that the two feature points correspond to the same 3d point. The matching pair with high matching value is selected as the feature point matching pair such that calculation complexity and calculation time thereafter can be reduced as well.

It is better in any one of the technical solutions above that calculating the relative rotation angle according to the feature point matching pairs comprises: calculating a rotation matrix of the two cameras whenever N feature point matching pairs are selected, wherein N is a positive integer greater than or equals to 8; calculating an amount of outlier matching pairs corresponding to each rotation matrix; selecting the rotation matrix with least amount of outlier matching pairs as a finally determined rotation matrix of the two cameras; and calculating a rotation angle on the x-axis, y-axis, and z-axis which the camera should be rotated relating to the other camera according to the finally determined rotation matrix.

After the feature point pairs are matched, a rotation matrix between the two cameras is calculated by using every eight matching pairs. For example, if there were eighty matching pairs, ten rotation matrices between the two cameras can be calculated. It can be repeated that eight feature point matching pairs are selected from the plural feature point matching pairs randomly, and therefore another ten rotation matrices can be obtained accordingly. The more the repeat is made, the more the rotation matrices are obtained. After that, a best rotation matrix is selected as the rotation matrix of the binocular camera. The selecting method is to calculate the amount of outlier matching pairs. The less the amount of outlier matching pairs are, the better the rotation matrix fits the relative rotation angle now of the binocular camera. Accordingly, the rotation matrix with least amount of outlier matching pairs is selected as the rotation matrix between the two cameras, and finally, the angle of optical axes of the two cameras in different directions can be calculated basing on the rotation matrix.

Because the selected feature point matching pairs are combined randomly, a rotation matrix is calculated in accordance to each random combination, and adapted rotation matrix is finally selected there from in the present invention, the calculated rotation matrix is relatively precise and has an error much smaller than the sensing error of a sensor. Therefore, the calculated angle by computer vision technology is relatively precise and is with a measuring precision higher than that of manual resetting and sensor sensing resetting, such that the binocular camera can precisely reach the original position.

It is better in the above technical solutions that adjusting the spaced distance between the two cameras to the preset distance comprises: obtaining a corresponding relationship between an image horizontal parallax and the spaced distance between the two cameras; determining the spaced distance now between the two cameras according to the corresponding relationship and the image horizontal parallax now between the two cameras; and deciding whether the determined spaced distance between the two cameras corresponds to the preset distance between the two cameras when the two cameras are at the preset original position; if not, adjusting the spaced distance between the two cameras.

After calculating the relative rotation angle between the optical axes of the two cameras and performing the angle adjustment, the distance between the two cameras is adjusted to a preset distance. The corresponding relationship between the image horizontal parallax and the spaced distance between the two cameras should be obtained first when performing distance adjustment. After obtaining the corresponding relationship, the real distance now between the two cameras can be obtained according to the image horizontal parallax now between the two cameras. If the real distance between the two cameras is not the preset distance, the distance between the two cameras should be adjusted to the preset distance, or no adjustment is needed.

The real distance between the two cameras is indirectly determined according to the image horizontal parallax by using the corresponding relationship between the distance between the two cameras and the image horizontal parallax. It is not necessary to determine whether the distance between the two cameras corresponds to a requirement by directly measuring the distance between the two cameras. Because the image horizontal parallax is calculated according to the feature points of the images photographed by the two cameras, the calculated result is more precise than the real distance between the two cameras measured by measure tools.

It is better in any one of the technical solutions above that obtaining the corresponding relationship between the image horizontal parallax and the spaced distance between the two cameras comprises: photographing a left image and a right image by the two cameras respectively at a first time when the optical axes of the two cameras are parallel, and calculating a first average parallax between the left image and the right image at the first time; controlling one of the two cameras to move a unit length in order to photograph the left image and the right image by the two cameras respectively at a second time, and calculating a second average parallax between the left image and the right image at the second time; and obtaining the corresponding relationship according to relationship between an average parallax difference and the unit length, wherein the average parallax difference is difference between the first average parallax and the second average parallax.

There are many methods to obtain the corresponding relationship between the image horizontal parallax and the spaced distance between the two cameras, such as presetting or real-time measuring, wherein the method of real-time measuring is more precise since the effect of external disturbances such as manual intervention can be avoid.

When the two cameras at a relative position, the horizontal parallax between the left and right images photographed at this time is calculated; then one of the two cameras moves a distance of a unit length, and the horizontal parallax between the left and right images photographed at this time is calculated. After that, the difference between the horizontal parallaxes after moving the distance of the unit length, i.e. the difference of horizontal parallax corresponding to the distance of one unit length, is determined.

It is better in any one of the technical solutions above that calculating average parallax between the left image and the right image comprises: detecting a plurality of feature points of the left image and the right image at the first time, matching the feature points of the left image and the feature points of the right image to obtain a plurality of matching pairs, and calculating a parallax of each matched pairs to obtain the first average parallax at the first time; and detecting a plurality of feature points of the left image and the right image at the second time, matching the feature points of the left image and the feature points of the right image to obtain a plurality of matching pairs, and calculating a parallax of each matched pairs to obtain the second average parallax at the second time.

There are still many methods to calculate the horizontal parallax between the left and right images. A better method is like the method of calculating the rotation angle between the optical axes of the cameras: detecting feature points of left and right images, matching the feature points of left and right images to obtain a plurality of matching pairs, calculating horizontal parallax of each matching pair, and averaging the calculated horizontal parallaxes to obtain the average horizontal parallax.

It is better in any one of the technical solutions above that the parallax of the corresponded matching pair is ensured to be errorless and the first average parallax and the second average parallax are calculated according to the errorless parallax by satisfying the following condition: the feature points of the left image at the first time are matched with the feature points of the left image at the second time, or the feature points of the right image at the first time are matched with the feature points of the right image at the second time.

In order to further determine whether there is error in the horizontal parallax in each matching pair, the method mentioned above can be applied. If a feature point in the left image at the first time matches one feature point in the left image at the second time, and this feature point, which is in the left image at the second time, matches one feature point in the right image at the second time, the horizontal parallax corresponding to the matching pair is decided to be errorless. Calculating the average horizontal parallax according to the errorless horizontal parallax increases the precision of the calculated average horizontal parallax for improving the degree of calculation precision of the spaced distance between the cameras such that the binocular camera is capable of being at the precision original position.

It is better in any one of the technical solutions above that completing the rough adjustment of the two cameras concretely comprises: driving the two cameras to corresponding original positions respectively while receiving a reset command; and driving the two cameras to rotate over a preset angle and to move the preset distance in opposite direction respectively after the two cameras reach the corresponding original positions respectively.

The proposed solution utilizes automatic resetting during the rough adjustment to complete the rough adjustment by using motors to drive the two cameras when sending resetting command. A fine adjustment method provided by the present invention is utilized after the rough adjustment of the two cameras is completed. The binocular camera can be at the precision original position after users trigger the resetting switch without manual operation in the middle process such that the effect of one key resetting can be achieved.

According to another aspect of the present invention, there provides a binocular camera resetting apparatus comprising: a processor, connecting to a controller, and obtaining a first image and a second image photographed by two cameras at the same time respectively after a rough adjustment of the two cameras is completed, calculating a relative rotation angle between the two cameras using a plurality of feature points of the first image acquired by one camera and the feature points of the second image acquired by the other camera and sending an angle control command to the controller, and obtaining a spaced distance between the two cameras and sending a distance control command to the controller; the controller, connecting to two driving units, and sending the first control signal to the two driving units while receiving the angle control command, and sending the second control signal to the two driving units while receiving the distance control command; and the two driving unit, connecting to the two cameras respectively, and controlling one of the two cameras to rotate over the relative rotation angle to parallelize the optical axes of the rotated camera and the other camera while receiving the first control signal, and, while receiving the second control signal, adjusting a spaced distance between the two cameras to a preset distance in order to ensure that the two cameras are at a preset original position.

When resetting the binocular camera, the two cameras are roughly adjusted firstly. The rough adjusting might adopt the reset adjusting methods nowadays, such as manual adjusting method or sensor-based adjusting method. Because the cameras do not reach the precision original position, the technical solution mentioned above obtains angle between the optical axes of the two cameras by computer vision technology, and adjusts the binocular camera pose based on the calculated angle for placing the binocular camera at the ideal starting position in order to prevent from the error generated by the reset adjusting method nowadays.

In order to make the binocular camera reach the original position, the distance between the two cameras should be a preset distance besides the optical axes of the two cameras should be parallel. By doing so, there is only parallax between the left and right images photographed by the binocular camera. Since errors generated by manual adjusting and sensor checking are avoided, the stereo video effect obtained by the binocular camera using the resetting method could be better.

It is better in any one of the technical solutions above that the processor comprises: a feature point detecting unit for detecting a plurality of feature points of the first image and a plurality of feature points of the second image, respectively; a matching pair obtaining unit for matching the feature points of the first image and the feature points of the second image to obtain a plurality of feature point matching pairs; and an angle calculating unit for calculating the relative rotation angle according to the feature point matching pairs.

The present invention obtains related angles between the optical axes of the two cameras by computer vision technology. There are several ways to calculate the related angles. In a better embodiment, the feature points of the left and right images are detected, and the amount of the feature points can be preset. The feature points of the left and right images are then matched to obtain a plurality of matching pairs. The relative rotation angle can be calculated by using these matching pairs. The angle calculating procedure is performed by using images photographed by the left and right cameras without sensors, so that the error generated by the sensor can be avoided.

It is better in any one of the technical solutions above that the feature point detecting unit comprises: a pixel feature score calculating subunit and a feature selecting subunit, wherein the pixel feature score calculating subunit calculates a pixel feature score of each pixel in each of the images, and the feature selecting subunit selects a predetermined amount of pixels each with pixel feature score greater than a threshold to be the feature points of each of the images; and the matching pair obtaining unit comprises a matching subunit for matching each of the feature points of the first image with all the feature points in neighborhood of a position in the second image the same as the position where the matching feature point of the first image is, and selecting two feature points having a highest matching value as one of the feature point matching pairs.

It is necessary to calculate pixel feature score of each pixel and then select the pixel with pixel feature score greater than a threshold as a feature point when detecting the feature points of the image. That is, feature pixels are selected from each image such that calculation time needed thereafter can be reduced. After that, the feature points of the left and right images are matched and matching value (i.e. degree of matching) of each matching pairs is calculated. The higher the matching value is, the higher the possibility that the two feature points correspond to the same 3d point is. The matching pair with high matching value is selected as the feature point matching pair such that calculation complexity and calculation time thereafter can be reduced as well.

It is better in any one of the technical solutions that the angle calculating unit comprises: a rotation matrix calculating subunit for calculating a rotation matrix of the two cameras whenever N feature point matching pairs are selected, and calculating an amount of outlier matching pairs corresponding to each rotation matrix and selecting the rotation matrix with least amount of outlier matching pairs as a finally determined rotation matrix of the two cameras; and a rotation angle calculating subunit for calculating a rotation angle on the x-axis, y-axis, and z-axis which the camera should be rotated relating to the other camera according to the finally determined rotation matrix, wherein N is a positive integer greater than or equals to 8.

After the feature point pairs are matched, a rotation matrix between the two cameras is calculated by using every eight matching pairs. For example, if there were eighty matching pairs, ten rotation matrices between the two cameras can be calculated. It can be repeated that eight feature point matching pairs are selected from the plural feature point matching pairs randomly, and therefore another ten rotation matrices can be obtained accordingly. The more the repeat is made, the more the rotation matrices are obtained. After that, a best rotation matrix is selected as the rotation matrix of the binocular camera. The selecting method is to calculate the amount of outlier matching pairs. The less the amount of outlier matching pairs are, the better the rotation matrix fits the relative rotation angle now of the binocular camera. Accordingly, the rotation matrix with least amount of outlier matching pairs is selected as the rotation matrix between the two cameras, and finally, the angle of optical axes of the two cameras in different directions can be calculated basing on the rotation matrix.

Because the selected feature point matching pairs are combined randomly, a rotation matrix is calculated in accordance to each random combination, and adapted rotation matrix is finally selected there from in the present invention, the calculated rotation matrix is relatively precise and has an error much smaller than the sensing error of a sensor. Therefore, the calculated angle by computer vision technology is relatively precise and is with a measuring precision higher than that of manual resetting and sensor sensing resetting, such that the binocular camera can precisely reach the original position.

It is better in any one of the technical solutions above that the processor comprises: a corresponding relationship obtaining unit for obtaining a corresponding relationship between an image horizontal parallax and the spaced distance between the two cameras; a distance calculating unit for determining the spaced distance now between the two cameras according to the corresponding relationship and the image horizontal parallax now between the two cameras; and a decision unit for deciding whether the determined spaced distance between the two cameras corresponds to the preset distance between the two cameras when the two cameras are at the preset original position; if not, adjusting the spaced distance between the two cameras.

After calculating the relative rotation angle between the optical axes of the two cameras and performing the angle adjustment, the distance between the two cameras is adjusted to a preset distance. The corresponding relationship between the image horizontal parallax and the spaced distance between the two cameras should be obtained first when performing distance adjustment. After obtaining the corresponding relationship, the real distance now between the two cameras can be obtained according to the image horizontal parallax now between the two cameras. If the real distance between the two cameras is not the preset distance, the distance between the two cameras should be adjusted to the preset distance, or no adjustment is needed.

It is better in any one of the technical solution above that the corresponding relationship obtaining unit comprises: a first average parallax calculating subunit for photographing a left image and a right image by the two cameras respectively at a first time when the optical axes of the two cameras are parallel, and calculating a first average parallax between the left image and the right image at the first time; a second average parallax calculating subunit for controlling one of the two cameras to move a unit length in order to photograph the left image and the right image by the two cameras respectively at a second time, and calculating a second average parallax between the left image and the right image at the second time; and a corresponding relationship calculating subunit for obtaining the corresponding relationship according to relationship between an average parallax difference and the unit length, wherein the average parallax difference is difference between the first average parallax and the second average parallax.

There are many methods to obtain the corresponding relationship between the image horizontal parallax and the spaced distance between the two cameras, such as presetting or real-time measuring the corresponding relationship, wherein the method of real-time measuring is more precise since the effect of external disturbances such as manual intervention can be avoided. When the two cameras are at a relative position, the horizontal parallax between the left and right images photographed at this time is calculated; then one of the two cameras moves a distance of a unit length, and the horizontal parallax between the left and right images photographed at this time is calculated. After that, the difference between the horizontal parallaxes after moving the distance of the unit length, i.e. the difference of horizontal parallax corresponding to the distance of one unit length, is determined.

It is better in any one of the technical solutions above that the corresponding relationship obtaining unit comprises: a first parallax calculating unit for detecting a plurality of feature points of the left image and the right image at the first time, matching the feature points of the left image and the feature points of the right image to obtain a plurality of matching pairs, and calculating a parallax of each matched pairs to obtain the first average parallax at the first time; and a second parallax calculating unit for detecting a plurality of feature points of the left image and the right image at the second time, matching the feature points of the left image and the feature points of the right image to obtain a plurality of matching pairs, and calculating a parallax of each matched pairs to obtain the second average parallax at the second time.

There are still many methods to calculate the horizontal parallax between the left and right images. A better method is like the method of calculating the rotation angle between the optical axes of the cameras: detecting feature points of left and right images, matching the feature points of left and right images to obtain a plurality of matching pairs, calculating horizontal parallax of each matching pair, and averaging the calculated horizontal parallaxes to obtain the average horizontal parallax.

It is better in any one of the technical solutions above that the processor further comprises: a checking unit. This unit is charged to ensure that the determined parallax of the corresponded matching pair is errorless and the first average parallax and the second average parallax are calculated according to the errorless parallax by satisfying the following condition: the feature points of the left image at the first time are matched with the feature points of the left image at the second time, or the feature points of the right image at the first time are matched with the feature points of the right image at the second time.

In order to further determine whether there is error in the horizontal parallax in each matching pair, the method mentioned above can be applied. If a feature point in the left image at the first time matches one feature point in the left image at the second time, and this feature point, which is in the left image at the second time, matches one feature point in the right image at the second time, the horizontal parallax corresponding to the matching pair is decided to be errorless. Calculating the average horizontal parallax according to the errorless horizontal parallax increases the precision of the calculated average horizontal parallax for improving the degree of calculation precision of the spaced distance between the cameras such that the binocular camera is capable of being at the precision original position.

It is better in any one of the technical solution above that the processor further sends a reset command to the controller while receiving a triggering signal of a reset switch; the controller further sends a third control signal to the two driving units while receiving the reset command; each of the driving units further drives the corresponding camera for completing the rough adjustment while receiving the third control signal; wherein each of the driving unit comprises: a first driving motor for driving the two cameras to corresponding original positions respectively while receiving a reset command, and driving the two cameras to move the preset distance in opposite direction respectively after the two cameras reach the corresponding original positions respectively; and a second driving motor for driving the two cameras to rotate a preset angle after the two cameras reach the corresponding original positions respectively.

The proposed solution utilizes automatic resetting during the rough adjustment to complete the rough adjustment by using motors to drive the two cameras when sending resetting command. A fine adjustment method provided by the present invention is utilized after the rough adjustment of the two cameras is completed respectively. The binocular camera can be at the precision original position after users triggering the resetting switch without manual operation participating in the middle process such that the effect of one key resetting can be achieved.

DETAILED DESCRIPTION OF PREFERRED EMBODIMENTS

The present invention will now be described more specifically with reference to the drawings and following embodiments in order to realize the above objects, features and advantages of the present invention. It is to be noted that the features in the embodiments of the present application can be combined together when they do not conflict with each other.

In order to fully understand the present invention, many details are described in the following descriptions. However, the present invention can be implemented by other method different from those described herein. Therefore, the present invention is not limited to the limitations in the concrete embodiment disclosed below.

Figure 1:
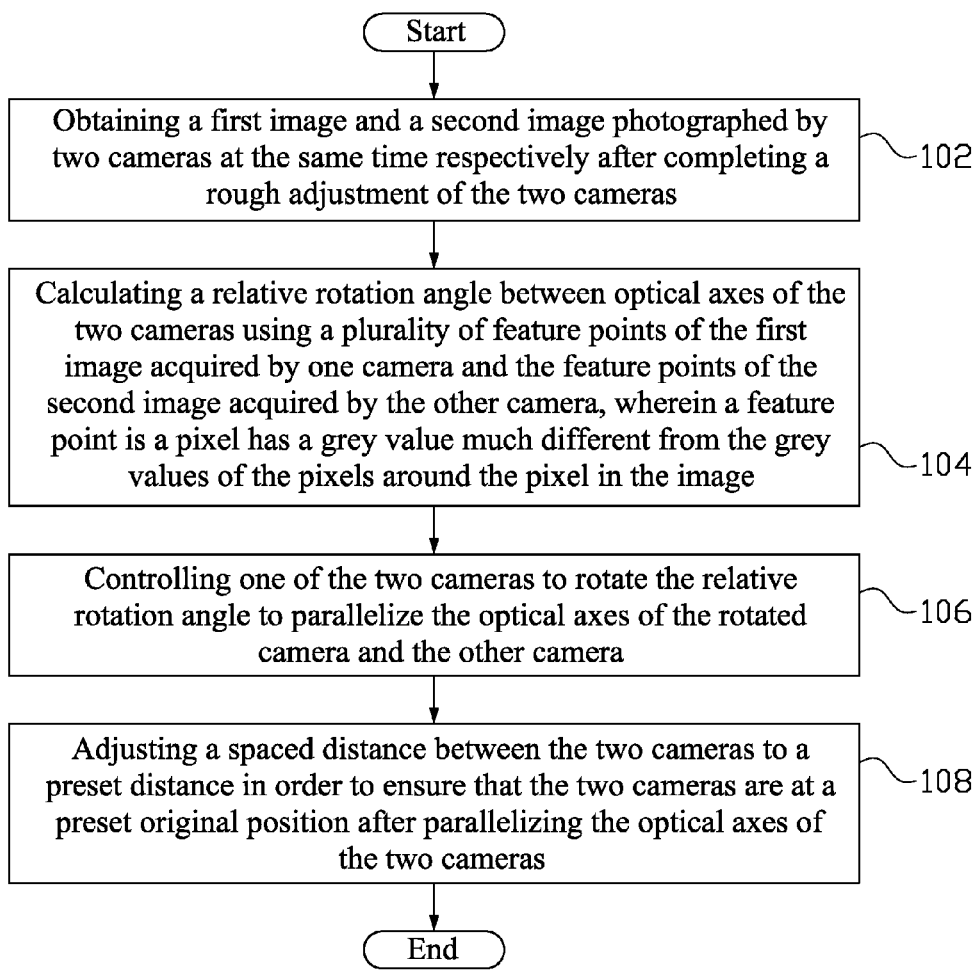
FIG. 1 illustrates a flow chart of the binocular resetting method according to one embodiment of the present invention.

FIG. 1 illustrates a flow chart of the binocular resetting method according to one embodiment of the present invention.

As shown in FIG. 1, the binocular camera resetting method might comprise the steps below:

Step 102 is for obtaining a first image and a second image photographed by two cameras at the same time respectively after completing a rough adjustment of the two cameras.

Step 104 is for calculating a relative rotation angle between optical axes of the two cameras using a plurality of feature points of the first image acquired by one camera and the feature points of the second image acquired by the other camera, wherein a feature point is a pixel has a grey value much different from the grey values of the pixels around the pixel in the image.

Step 106 is for controlling one of the two cameras to rotate the relative rotation angle to parallelize the optical axes of the rotated camera and the other camera.

Step 108 is for adjusting a spaced distance between the two cameras to a preset distance in order to ensure that the two cameras are at a preset original position after parallelizing the optical axes of the two cameras.

When resetting the binocular camera, the two cameras are roughly adjusted firstly. The rough adjusting might adopt the reset adjusting methods nowadays, such as manual adjusting method or method of checking by sensor. Because the cameras do not reach the precision original position, the technical solution mentioned above obtains angle between the optical axes of the two cameras by computer vision technology, and adjusts the binocular camera pose based on the calculated angle for placing the binocular camera at the ideal original position in order to prevent from the error generated by the reset adjusting method nowadays.

In order to make the binocular camera reach the original position, the distance between the two cameras should be a preset distance besides the optical axes of the two cameras should be parallel. Therefore the spaced distance between the two cameras is adjusted to the preset distance after keeping the optical axes of the two cameras parallelized. By doing so, there is only parallax between the left and right images photographed by the binocular camera. Since errors generated by manual adjusting and sensor checking are avoided, the stereo video effect obtained by the binocular camera using the resetting method could be better.

It is better in any one of the technical solution above that the step 104 concretely comprises: detecting a plurality of feature points of the first image and a plurality of feature points of the second image, respectively; matching the feature points of the first image and the feature points of the second image to obtain a plurality of feature point matching pairs; and calculating the relative rotation angle according to the feature point matching pairs.

The present invention obtains related angles between the optical axes of the two cameras by computer vision technology. There are several ways to calculate the related angles. In a better embodiment, the feature points of the left and right images are detected, and the amount of the feature points can be preset. The feature points of the left and right images are then matched to obtain a plurality of matching pairs. The relative rotation angle can be calculated by using these matching pairs. The angle calculating procedure is performed by using images photographed by the left and right cameras without sensors, so that the error generated by the sensor can be avoided.

It is better in any one of the technical solutions above that detecting the feature points of the first image and the feature points of the second image, respectively in step 104 might concretely comprise: calculating a pixel feature score of each pixel in each of the images; and selecting a predetermined amount of pixels each with pixel feature score greater than a threshold to be the feature points of each of the images. And, matching the feature points of the first image and the feature points of the second image might concretely comprise: matching each of the feature points of the first image with all the feature points in neighborhood of a position in the second image the same as the position where the matching feature point of the first image is; and selecting two feature points having a highest matching value as one of the feature point matching pairs.

It is necessary for calculating pixel feature score of each pixel and then selecting the pixel with pixel feature score greater than a threshold as a feature point when detecting the feature points of the image. That is, feature pixels are selected from each image such that calculation time needed thereafter can be reduced. After that, the feature points of the left and right images are matched and matching value (i.e. degree of matching) of each matching pairs is calculated. The higher the matching value is, the higher the possibility that the two feature points correspond to the same 3d point. The matching pair with high matching value is selected as the feature point matching pair such that calculation complexity and calculation time thereafter can be reduced as well and therefore the processing efficiency is improved.

It is better in any one of the technical solutions above that calculating the relative rotation angle according to the feature point matching pairs in the step 104 might comprise: calculating a rotation matrix of the two cameras whenever N (N is a positive integer greater than or equals to 8) feature point matching pairs are selected; calculating an amount of outlier matching pairs corresponding to each rotation matrix; selecting the rotation matrix with least amount of outlier matching pairs as a finally determined rotation matrix of the two cameras; and calculating a rotation angle on the x-axis, y-axis, and z-axis which the camera should be rotated relating to the other camera according to the finally determined rotation matrix.

After the feature point pairs are matched, a rotation matrix between the two cameras is calculated by using every eight matching pairs. For example, if there were eighty matching pairs, ten rotation matrices between the two cameras can be calculated. It can be repeated that eight feature point matching pairs are selected from the plural feature point matching pairs randomly, and therefore another ten rotation matrices can be obtained accordingly. The more the repeat is made, the more the rotation matrices are obtained. After that, a best rotation matrix is selected as the rotation matrix of the binocular camera. The selecting method is to calculate the amount of outlier matching pairs. The less the amount of outlier matching pairs are, the better the rotation matrix fits the relative rotation angle now of the binocular camera. Accordingly, the rotation matrix with least amount of outlier matching pairs is selected as the rotation matrix between the two cameras, and finally, the angle of optical axes of the two cameras in different directions can be calculated basing on the rotation matrix.

Because the selected feature point matching pairs are combined randomly, a rotation matrix is calculated in accordance to each random combination, and adapted rotation matrix is finally selected there from in the present invention, the calculated rotation matrix is relatively precise and has an error much smaller than the sensing error of a sensor.

Therefore, the calculated angle by computer vision technology is relatively precise and is with a measuring precision higher than that of manual resetting and sensor sensing resetting, such that the binocular camera can precisely reach the original position.

It is better in any one of the technical solutions above that adjusting the spaced distance between the two cameras to the preset distance comprises: obtaining a corresponding relationship between an image horizontal parallax and the spaced distance between the two cameras; determining the spaced distance now between the two cameras according to the corresponding relationship and the image horizontal parallax now between the two cameras; and deciding whether the determined spaced distance between the two cameras corresponds to the preset distance between the two cameras when the two cameras are at the preset original position; if not, adjusting the spaced distance between the two cameras.

After calculating the relative rotation angle between the optical axes of the two cameras and performing the angle adjustment, the distance between the two cameras is adjusted to a preset distance. The corresponding relationship between the image horizontal parallax and the spaced distance between the two cameras should be obtained first when performing distance adjustment. After obtaining the corresponding relationship, the real distance now between the two cameras can be obtained according to the image horizontal parallax now between the two cameras. If the real distance between the two cameras is not the preset distance, the distance between the two cameras should be adjusted to the preset distance, or no adjustment is needed.

It is better in any one of the technical solutions above that obtaining the corresponding relationship between the image horizontal parallax and the spaced distance between the two cameras might concretely comprise the processing procedure as follows:

Photographing a left image and a right image by the two cameras respectively at a first time when the optical axes of the two cameras are parallel, and calculating a first average parallax between the left image and the right image at the first time; controlling one of the two cameras to move a unit length in order to photograph the left image and the right image by the two cameras respectively at a second time, and calculating a second average parallax between the left image and the right image at the second time; and obtaining the corresponding relationship according to the relationship between an average parallax difference and the unit length, wherein the average parallax difference is difference between the first average parallax and the second average parallax.

There are many methods to obtain the corresponding relationship between the image horizontal parallax and the spaced distance between the two cameras, such as presetting or real-time measuring, wherein the method of real-time measuring is more precise since the effect of external disturbances such as manual intervention can be avoid. When the two cameras are at a relative position, the horizontal parallax between the left and right images photographed at this time is calculated; then one of the two cameras moves a distance of a unit length, and the horizontal parallax between the left and right images photographed at this time is calculated. After that, the difference between the horizontal parallaxes after moving the distance of the unit length, i.e. the difference of horizontal parallax corresponding to the distance of one unit length, is determined.

The real distance between the two cameras is indirectly determined according to the image horizontal parallax by using the corresponding relationship between the distance between the two cameras and the image horizontal parallax. It is not necessary to determine whether the distance between the two cameras corresponds to a requirement by directly measuring the distance between the two cameras. Because the image horizontal parallax is calculated according to the feature points of the images photographed by the two cameras, the calculated result is more precise than the real distance between the two cameras measured by measure tools.

It is worthy to note that, the moving direction is correct if the calculated average parallax difference (i.e. the difference between the first average parallax and the second parallax) is positive after one of the camera moves a distance of the unit length, and the moved camera is again moved along the original direction when adjusting the distance between the two cameras. If the calculated average parallax difference is negative, it indicates that the moved camera is excursed from the other camera, the real distance between the two cameras is excursed from the preset distance, and the moving direction is wrong, such that the moved camera is moved along a reverse direction when adjusting the distance between the two cameras. Therefore, a precise moving direction can be automatically determined according to the average parallax difference such that the real distance between the two cameras is approached to the preset distance and binocular camera resetting intelligence can be improved.

It is better in any one of the technical solutions above that calculating average parallax between the left image and the right image might concretely comprise:

Detecting a plurality of feature points of the left image and the right image at the first time, matching the feature points of the left image and the feature points of the right image to obtain a plurality of matching pairs, and calculating a parallax of each matched pairs to obtain the first average parallax at the first time; and detecting a plurality of feature points of the left image and the right image at the second time, matching the feature points of the left image and the feature points of the right image to obtain a plurality of matching pairs, and calculating a parallax of each matched pairs to obtain the second average parallax at the second time.

There are still many methods to calculate the horizontal parallax between the left and right images. A better method is like the method of calculating the rotation angle between the optical axes of the cameras: detecting feature points of left and right images, matching the feature points of left and right images to obtain a plurality of matching pairs, calculating horizontal parallax of each matching pair, and averaging the calculated horizontal parallaxes to obtain the average horizontal parallax.

It is better in any one of the technical solutions above that the determined parallax of the corresponded matching pair is ensured to be errorless and the first average parallax and the second average parallax are calculated according to the errorless parallax by satisfying the following condition: the feature points of the left image at the first time are matched with the feature points of the left image at the second time, or the feature points of the right image at the first time are matched with the feature points of the right image at the second time.

In order to further determine whether there is error in the horizontal parallax in each matching pair, the method mentioned above can be applied. If a feature point in the left image at the first time matches one feature point in the left image at the second time, and this feature point, which is in the left image at the second time, matches one feature point in the right image at the second time, the horizontal parallax corresponding to the matching pair is decided to be errorless. Calculating the average horizontal parallax according to the errorless horizontal parallax increases the precision of the calculated average horizontal parallax for improving the degree of calculation precision of the spaced distance between the cameras such that the binocular camera is capable of being at the precision original position.

It is better in any one of the technical solutions above that completing the rough adjustment of the two cameras might concretely comprise: driving the two cameras to corresponding original positions respectively while receiving a reset command; and driving the two cameras to rotate a preset angle and to move the preset distance in opposite direction respectively after the two cameras reach the corresponding original points in order to make the two cameras reach the original position respectively.

The proposed solution utilizes automatic resetting during the rough adjustment to complete the rough adjustment by using motors to drive the two cameras when sending resetting command. A fine adjustment method provided by the present invention is utilized after respectively completing the rough adjustment of the two cameras. The binocular camera can be at the precision original position after users trigger the resetting switch without manual operation participating in the middle process such that the effect of one key resetting can be achieved.

Figure 2:
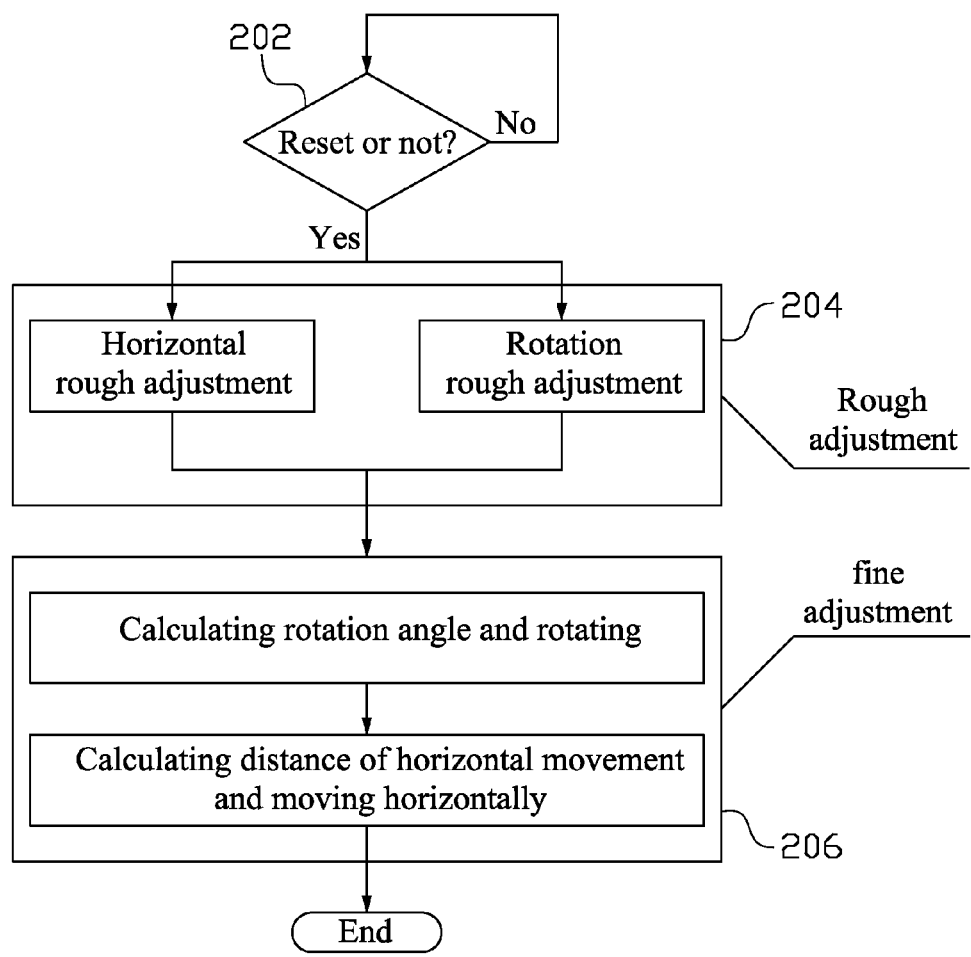
FIG. 2 illustrates a flow chart of the binocular resetting method according to another embodiment of the present invention.

FIG. 2 illustrates a flow chart of the binocular resetting method according to another embodiment of the present invention.

The original position, i.e. the position where the binocular camera is after automatically resetting every time, is set before first time usage.

As illustrated in FIG. 2, the binocular resetting method in the embodiment according to the present invention mainly comprises a rough adjustment part and a fine adjustment part.

Step 202 is for determining whether a resetting command for performing camera resetting is received. If yes, the procedure goes to step 204, otherwise continuously monitoring is performed for determining whether the resetting command is received.

Step 204 is for driving motor to complete the rough adjustment of the left and right cameras, which is known as the rough adjustment part of the resetting, after receiving the resetting command. Wherein, the procedure of rough adjustment comprises horizontal displacement rough adjustment and optical axis angle rough adjustment of the camera. The concrete procedure might be driving the two cameras to reach the positions, known as an original position, where the original sensors are, respectively. After that, the camera is moved horizontally a known distance and is rotated a known angle. The known distance and angle is the horizontal distance and rotation angle between the original position and the original position.

Step 206 is for performing rough adjustment of the resetting, which comprises: 1) calculating rotation angle needed to align the left and right cameras by computer vision technology, and driving motor to rotate one of the cameras such that the rotated camera is aligned with the other camera; 2) calculating horizontal displacement needed to make the left and right cameras reach the original position by using computer vision technology cooperated with automatic technology, and driving motor to move one of the cameras the needed distance to complete the automatic resetting.

Figure 3:
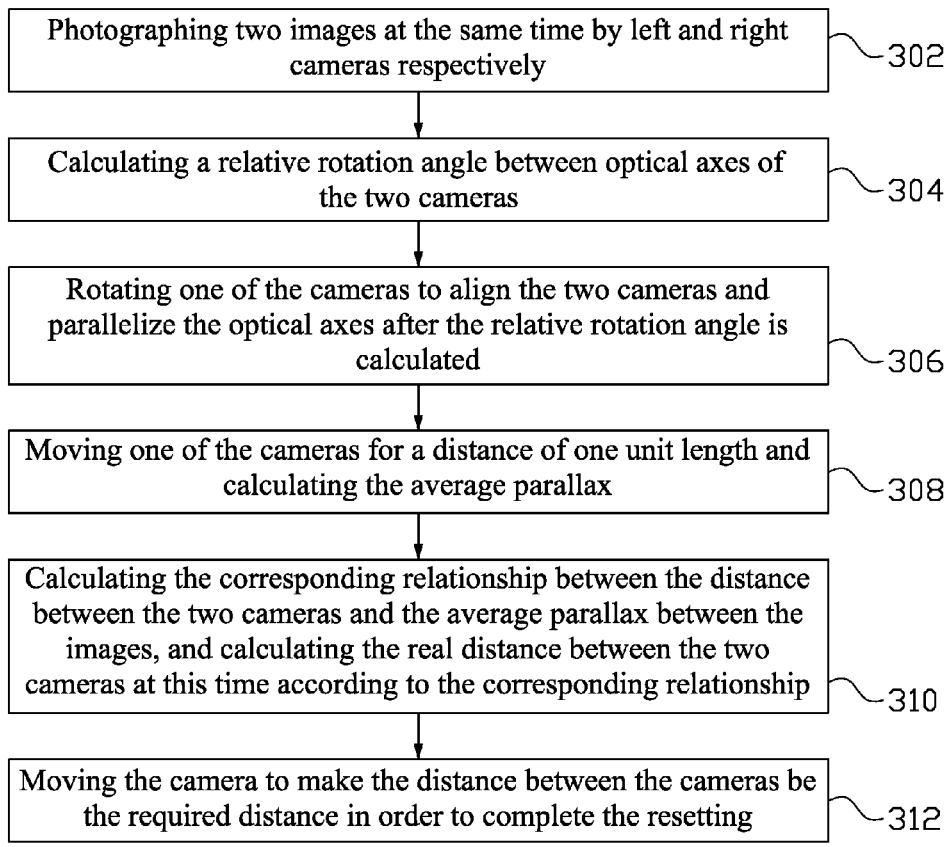
FIG. 3 illustrates a flow chart of the fine adjustment in FIG. 2.

FIG. 3 is combined to describe below in detail the fine adjustment procedure of the automatic resetting for the binocular camera.

Step 302 is for photographing two images at the same time by left and right cameras respectively.

Step 304 is for calculating a relative rotation angle between optical axes of the two cameras.

A plurality of classical computing methods in the computer vision technology, such as random sample consensus RANSAC (RANdom Sample Consensus), bundle adjustment, etc. are used in the embodiment. It is summarized that the feature point detecting is performed on left and right images respectively, and the feature points of the left image is matched with the feature points of the right image. After that, the rotation angle between the optical axes of the two cameras are repeatedly calculated by using different matching pairs, and a result with highest robustness is selected there from.

It is noted that the scene photographed by the cameras could be scenes with abundant veins or could be scenes comprising a checkerboard specialized for marking parameters of cameras in order to improve the accuracy and robustness of matching feature points.

Detailed description of each step is set as below.

Image feature point detecting and matching is performed herein: feature point detecting could simply be corner detecting. Each pixel feature score in the image is calculated. Each pixel feature score could be calculated by using Laplacian-of-Gaussian (LoG) of the pixel's grey level, Harris score with higher robustness, Harris Affine score or other feature point detection methods. After that, a certain amount (such as 500) of pixels with highest score in the whole area or each sub-area are selected as the feature points.

After that, the feature points detected from the left image are matched with the feature points detected from the right image, i.e. for each feature point of the left image, a feature point of the right image corresponding to the same space point as the feature point of the left image is searched. A concrete method that, for each feature point of the left image, is to find all feature points in neighborhood of the position in the right image, wherein the position in the right image is the same as the position where the feature point of the left image is, and matching values are calculated one by one according to a specific matching rule. Wherein, the matching rule could be calculating sum of squared differences of neighborhood pixels, or zero-mean normalized cross correlation of neighborhood pixels. Finally, the matched feature point pair with matching value greater than a threshold is selected (therefore a plurality of matching pairs are obtained) as the final result of this step.

Rotation angle is calculated herein: there are several methods to calculate the rotation angle between the optical axes of the two cameras according to one set of the matched feature point pair, and one of them is listed in the embodiment.

Assuming the left camera is the standard camera, the rotation angle the right camera should be rotated relating to the left camera is necessary for calculating. For any matched feature point pair $M=\{p_1, p_2\}$, wherein $p_1$ and $p_2$ are homogeneous representations of the projected coordinates of the left camera image and the right camera image onto which the same space point is projected respectively, there is a relationship as below under ideal situation:

$$(K_2^{-1}p_2)^T E K_1^{-1} p_1 = 0$$

K1 is the known intrinsic matrix of the left camera, K2 is the known intrinsic matrix of the right camera, and E is a 3×3 matrix which is known as essential matrix. Assuming the rotation matrix from the left camera to the right camera is:

$$R = \begin{bmatrix} R_{11} & R_{12} & R_{13} \\ R_{21} & R_{22} & R_{23} \\ R_{31} & R_{32} & R_{33} \end{bmatrix}$$

The shifting vector is $$t = \begin{bmatrix} t_x \\ t_y \\ t_z \end{bmatrix}$$

while $E=R[t]_x$, and wherein $$[t]_x = \begin{bmatrix} 0 & -t_z & t_y \\ t_z & 0 & -t_x \\ -t_y & t_x & 0 \end{bmatrix}$$

is the vector product matrix type of the vector t.

Eight equations can be established while randomly selecting eight set of the matched feature point pair. E can be calculated by combining with the ninth equation det (E)=0. After that, a singular value decomposition is performed on E to obtain that:

$$E=U\Sigma V^T$$

Furthermore, R and $[t]_x$ are calculated.

$$[t]_x = V W \Sigma V^T$$

$$R R U W^{-1} V^T$$

The result of $[t]_x$ is proportioned. The absolute result, i.e. the calculation of the real horizontal displacement of the left and right cameras, would be described in the following paragraphs.

After that, the calculated rotation matrix R can be directly used to calculate the rotation angle, or a plurality of robustness estimating method, such as random sample consensus RANSAC (RANdom Sample Consensus) can be applied to improve the robustness of the rotation matrix R:randomly selecting 8 matching pairs to calculate the rotation matrix and calculating the reprojection errors of all matching pairs generated according to the rotation matrix, and then calculating the amount of outlier matching pairs. The procedure above is repeated for a certain amount (such as 500) of times, and the rotation matrix corresponding to a least amount of outlier matching pairs is selected as the final rotation matrix.

After the rotation matrix R is calculated, the relative rotation angle between the two cameras can be calculated according to the method set below.

Assuming a, b, and c are the rotation angles in the x, y, and z axes the right camera rotated relative to the left camera respectively. The solution of b is $\sin^{-1}(R_{31})$ or $\pi+\sin^{-}(R_{31})$. Because the rotation angle is known to be a smaller one, b is the one having a minimum absolute value in the two solutions. As for a and c, $$a = \arctan\left(\frac{R_{22}}{\cos(b)}, \frac{R_{22}}{\cos(b)}\right), c = \arctan\left(\frac{R_{21}}{\cos(b)}, \frac{R_{11}}{\cos(b)}\right).$$

Because b is a small angle, cos(b) is not 0. Finally, the calculated rotation angle can be used directly to perform the rotation of the camera in the next step, or can be optimized by Bundle Adjustment for further improving the precision of the rotation angle. The theory of optimizing by Bundle Adjustment is to perform a plurality of iterations on the calculated rotation angle to make the sum of squared difference of all (sub-area) outlier matching pairs. The rotation angle obtained at this time is the optimized final rotation angle.

Step 306 is for rotating one of the cameras to align the two cameras and parallelize the optical axes after the relative rotation angle is calculated. After that, the average parallax between the images photographed by the two cameras at this time, and thus the horizontal displacement adjustment procedure is entered.

Step 308 is for moving one of the cameras for a distance of one unit length and calculating the average parallax between the images photographed by the two cameras at this time.

Step 310 is for calculating the corresponding relationship between the distance between the two cameras and the average parallax between the images, and calculating the real distance between the two cameras at this time according to the corresponding relationship.

Step 312 is for moving the camera to make the distance between the cameras be the required distance in order to complete the resetting.

The horizontal displacement adjustment procedure is described in detail set below.

In the beginning, one of the cameras is rotated over the calculated angle in order to align with the other camera (optical axes are parallel and in the same direction) after the calculated relative rotation angle between the left and right cameras is obtained. Assuming that the time now is t1, the left and right cameras are controlled to photograph the scene at the same time and the average parallax d1 between the left and right images is calculated.

After that, a camera is controlled to move left or right for one unit distance of a length u. U could be a known value between 1 mm and 2 cm here. Assuming that the time now is t2, the left and right cameras are controlled again to photograph the scene at the same time and the average parallax d2 of the left and right images now is calculated.

The system calculates the linear corresponding relationship between the parallax between the left and right images and the horizontal distance between the binocular camera according to d1 and d2, i.e. the parallax corresponds to the spaced distance u of one unit length between the two cameras is d2−d1. Furthermore, it is already known that the average parallax between the left and right images now is d2, therefore the real distance h between the left and right cameras can be calculated by the equation as follows:

$$h = \frac{d2}{d2-d1} u$$

It is already known that the preset distance reached when the two cameras are at the original position is g. Therefore, the resetting can be completed only by controlling the camera moved before to move a distance of (g-h) length along the same direction.

There are many methods for calculating the average parallax d1 and d2 between the left and right images, such as the method basing on feature point matching, or the method basing on densely matched parallax calculation diagram. The method basing on dense matching parallax calculation diagram is described in detail in the embodiment.

Figure 4:
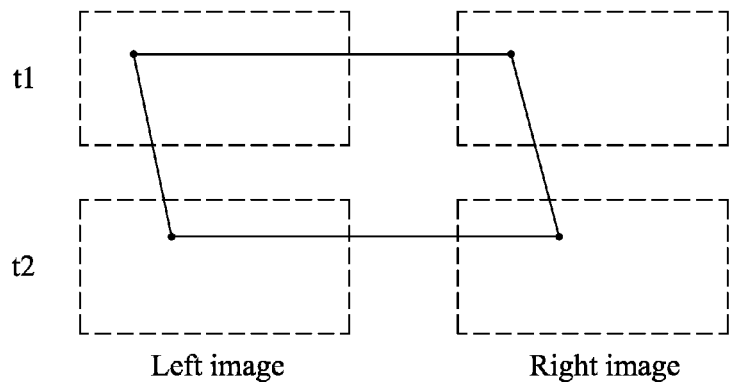
FIG. 4 illustrates a schematic diagram of determining matching pairs while calculating horizontal parallax according to one embodiment of the present invention.

As illustrated in FIG. 4, detecting and matching feature points is performed in the beginning as below:

a. Detecting and matching the feature points of the left and right images at the time t1, and calculating the horizontal parallax of each set of matching pairs.

b. Detecting and matching the feature points of the left and right images at the time t2, and calculating the horizontal parallax of each set of matching pairs.

c. Matching feature points of the left image at time t1 and t2.

d. Matching feature points of the right image at time t1 and t2.

It is noted that, the method for detecting and matching each single feature point is described in the description of precisely calculating the relative rotation angle between the left and right cameras, and is not repeated here.

The parallax result at the time t1 and t2 can be adopted only when a feature point is matched to its matching point in the left image or right image under the four situations a, b, c, and d (as shown in FIG. 4), or it cannot be adopted. Finally, the system calculates average of all adopted parallax such that the average parallax corresponding to the horizontal displacement of one unit length could be obtained.

The difference between the parallax calculation method basing on dense matching and the method basing on feature point matching is that the method based on feature point matching calculates feature score of each pixel, selects 500 feature points for performing feature point matching then, and calculates the relative rotation angle basing on the feature point matching pairs finally, however, the parallax calculation method basing on dense matching does not select the 500 feature points but uses each pixel as a feature point and performs matching calculation basing on all pixels. This is why it is named as the parallax calculation method basing on dense matching, and the matching theory is like that of the method basing on feature point matching and therefore it is not repeated here.

The automatic resetting method for binocular camera is described above in detail. The position and the binocular camera pose corresponding to each step is illustrated in FIG. 5A to FIG. 5F.

Figure 5A:
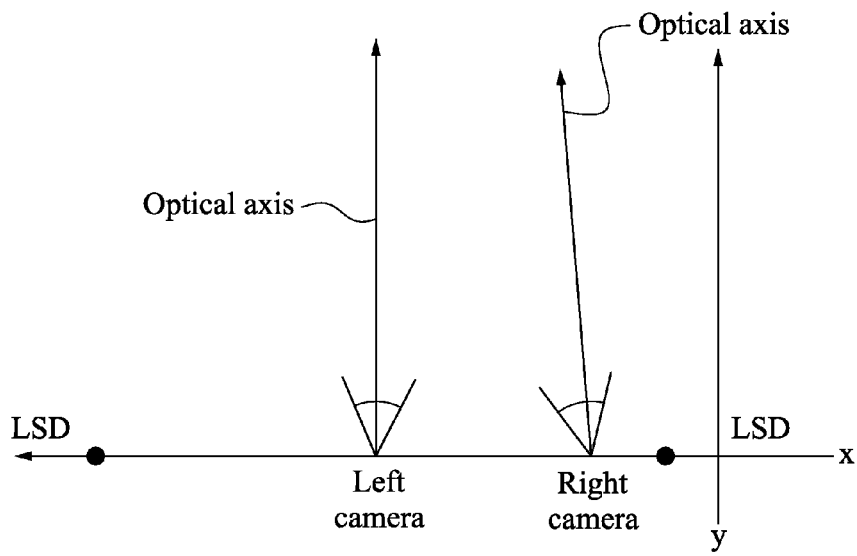
FIG. 5A to 5F respectively illustrates a schematic diagram showing position status of the binocular camera in each step of the resetting adjustment procedure according to one embodiment of the present invention.

As illustrated in FIG. 5A, the position and the binocular camera pose after completing a photographing mission is illustrated in the figure. It is necessary to reset the binocular camera to the original position in order to complete a next photographing mission. It can be known from the figure that the optical axes of the two cameras are not parallelized, and the two cameras are not at the original position.

Figure 5B:
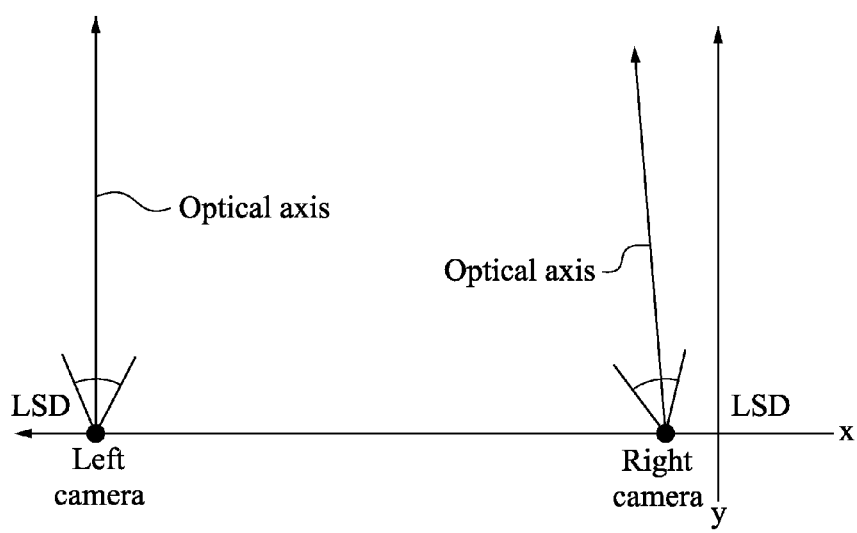

As illustrated in FIG. 5B, the rough adjustment is performed first to drive the two cameras to reach the original positions respectively when the resetting command is received. An original position sensor (original position switch LSD) is set at the original position of each camera, and when the sensor detects the camera, the camera is determined to reach the original position and is stopped from moving.

Figure 5C:
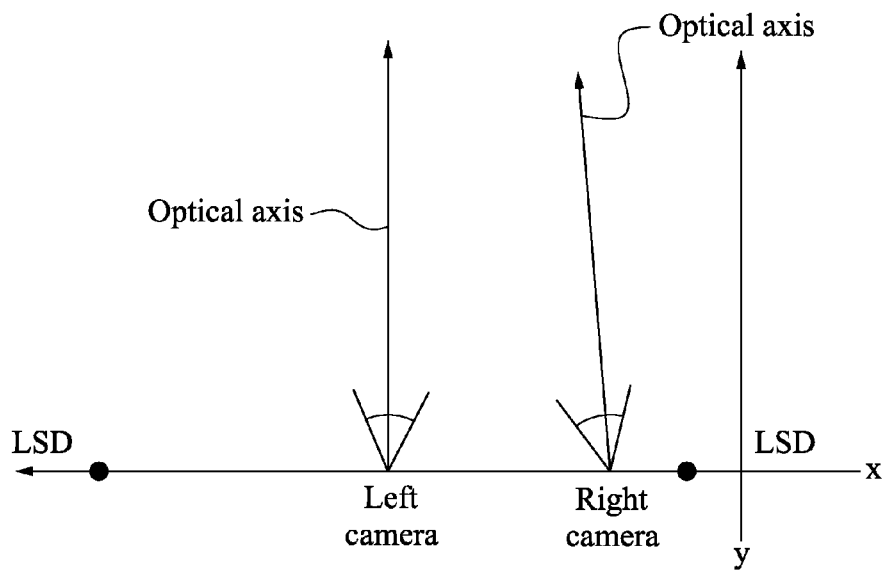

As illustrated in FIG. 5C, the rough adjustment is completed by moving a known distance horizontally or rotating a known angle. The known distance or angle is the horizontal distance and rotation angle between the original positions and the original position. The positions where the two cameras are in FIG. 5C is the positions after completing the rough adjustment but not the real original position, and the fine adjustment needs to be performed.

Figure 5D:
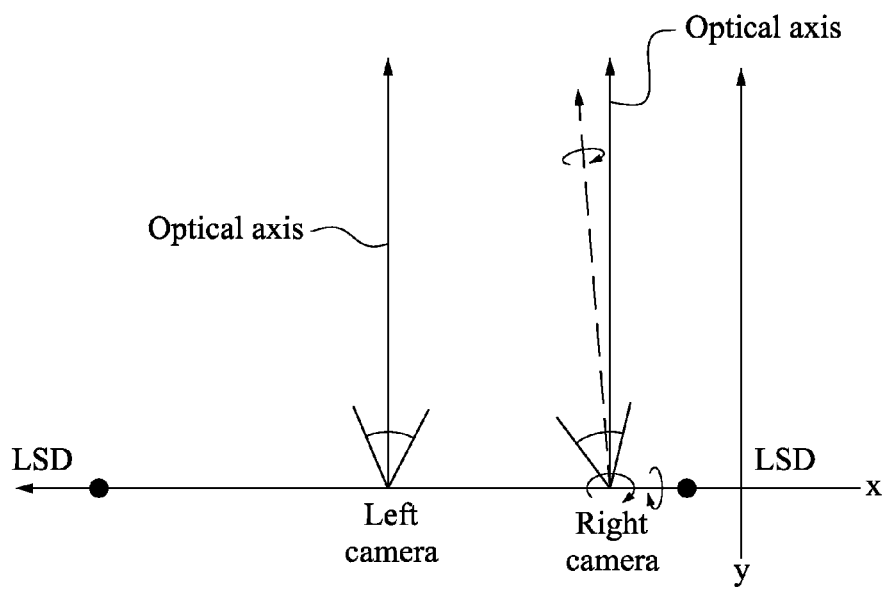

As illustrated in FIG. 5D, the left and right cameras are controlled to photograph two images at the same time, and then the images photographed at the same time are analyzed such that the rotation angle of one camera (A) relative to the other camera (B) is calculated. One of the cameras is selected as a standard and the other camera is controlled to rotate the calculated angle such that the two cameras are aligned and the optical axes are kept parallel.

Figure 5E:
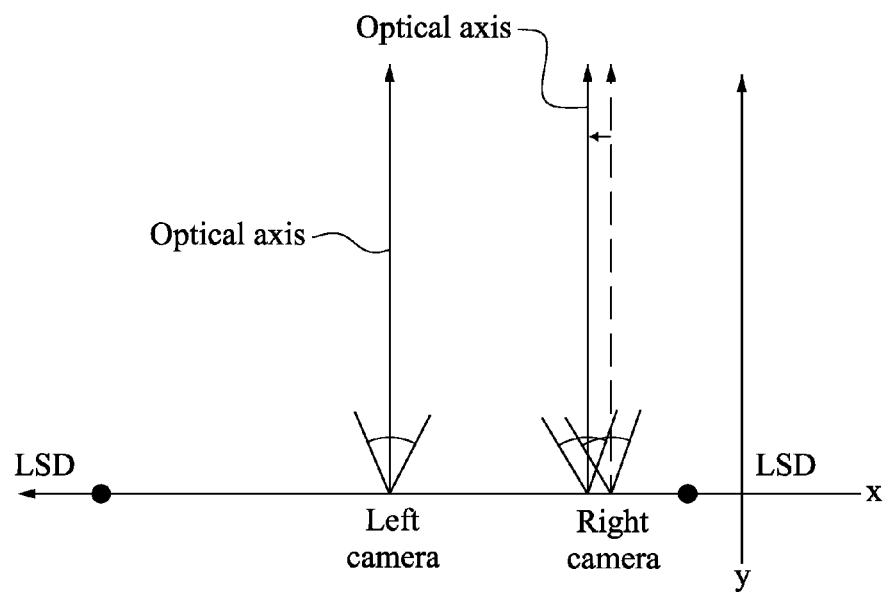
Figure 5F:
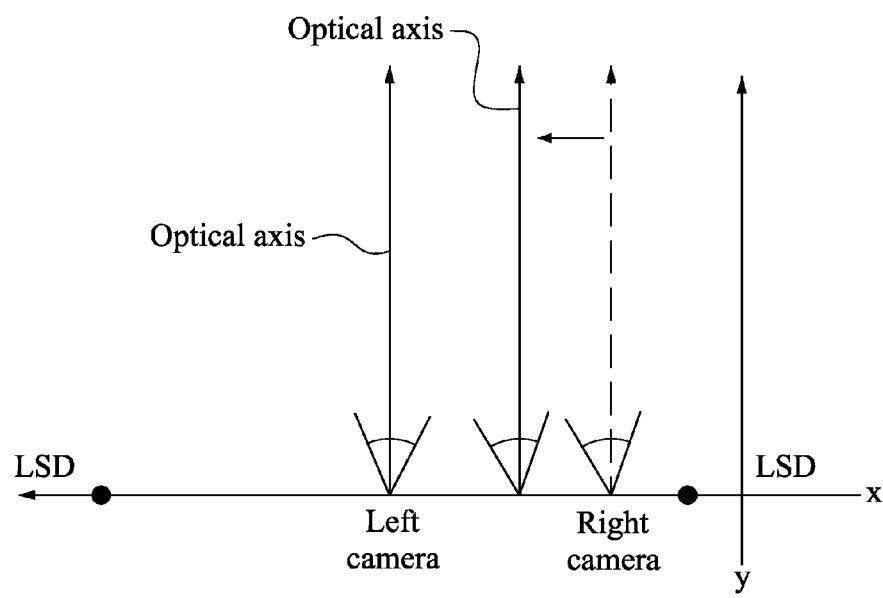

After that, the left and right cameras are controlled to photograph images now at the same time, and the average parallax between the images obtained by the left and right cameras is calculated. Then, as illustrated in FIG. 5E, the camera A is controlled to horizontally move one unit length distance, and the left and right cameras are controlled again to photograph the images at the same time and the average parallax between the images obtained by the left and right cameras is calculated. According to the two average parallaxes before and after, the corresponding relationship between the image parallax and the distance between the two cameras is calculated, and the real distance between the two cameras is calculated thereafter. Finally, as illustrated in FIG. 5F, the camera A is controlled to move horizontally such that the real distance between the two cameras reaches to the distance needed for the original position.

Figure 6:
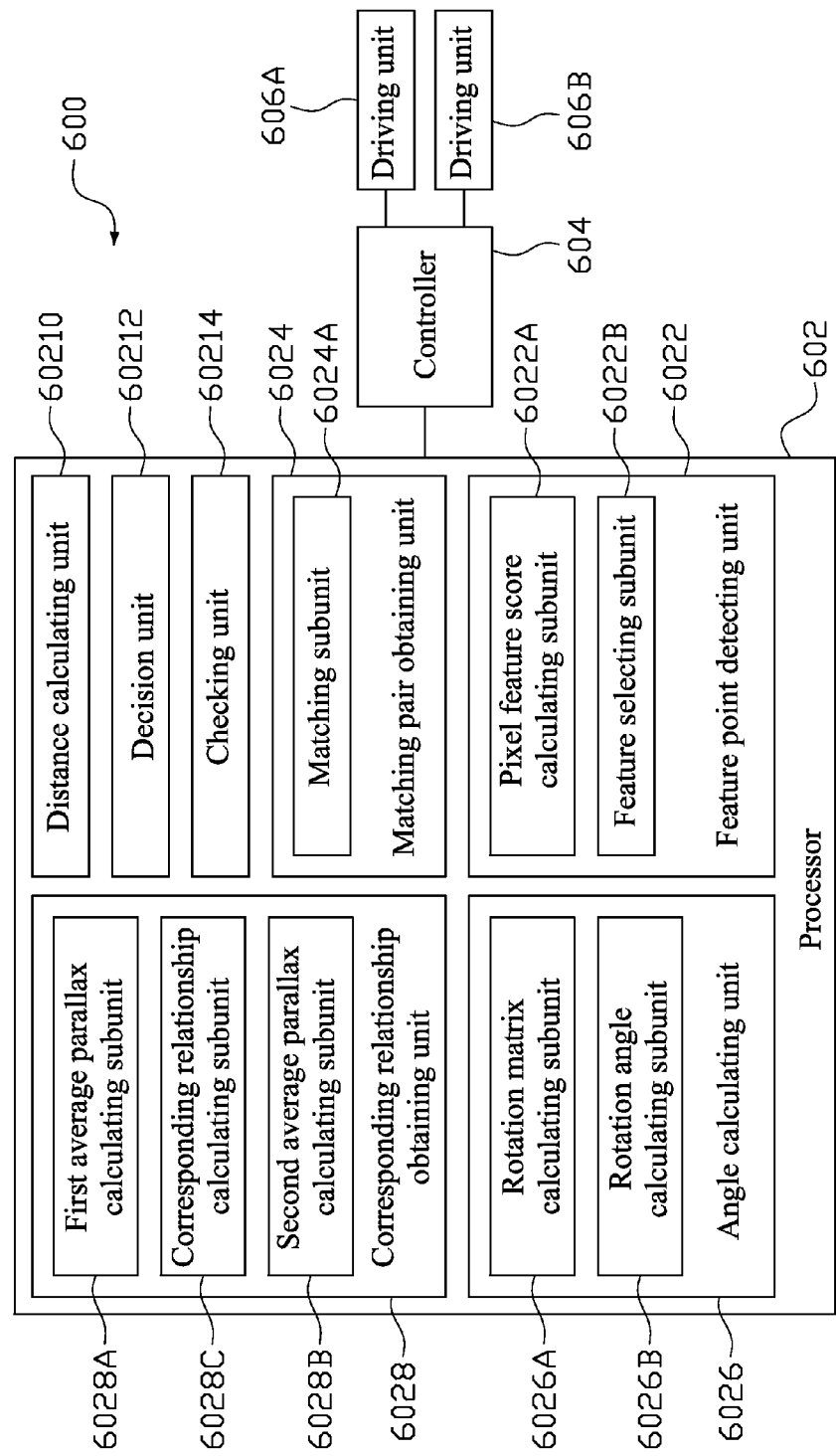
FIG. 6 illustrates a schematic diagram of the binocular camera resetting apparatus according to one embodiment of the present invention.

FIG. 6 illustrates the binocular camera resetting apparatus according to one embodiment of the present invention.

As illustrated in FIG. 6, the binocular camera resetting apparatus 600 according to one embodiment of the present invention comprises: a processor 602, connecting to a controller 604, and obtaining a first image and a second image photographed by two cameras at the same time respectively after a rough adjustment of the two cameras is completed, calculating a relative rotation angle between the two cameras using a plurality of feature points of the first image acquired by one camera and the feature points of the second image acquired by the other camera and sending an angle control command to the controller, and obtaining a spaced distance between the two cameras and sending a distance control command to the controller; the controller 604, connecting to two driving units, and sending the first control signal to the two driving units while receiving the angle control command, and sending the second control signal to the two driving units while receiving the distance control command; and the two driving unit (606A and 606B), connecting to the two cameras respectively, and, while receiving the first control signal, controlling one of the two cameras to rotate the relative rotation angle to parallelize the optical axes of the rotated camera and the other camera, and, while receiving the second control signal, adjusting a spaced distance between the two cameras to a preset distance in order to ensure that the two cameras are at a preset original position.

When resetting the binocular camera, the two cameras are roughly adjusted firstly. The rough adjusting might adopt the reset adjusting methods nowadays, such as manual adjusting method or method of checking by sensor. Because the cameras do not reach the precision original position, the technical solution mentioned above obtains angle between the optical axes of the two cameras by computer vision technology, and adjusts the binocular camera pose based on the calculated angle for placing the binocular camera at the ideal starting position in order to prevent from the error generated by the reset adjusting method nowadays.

In order to make the binocular camera reach the original position, the distance between the two cameras should be a preset distance besides the optical axes of the two cameras should be parallel. By doing so, there is only parallax between the left and right images photographed by the binocular camera. Since errors generated by manual adjusting and sensor checking are avoided, the stereo video effect obtained by the binocular camera using the resetting method could be better.

It is better in any one of the technical solutions above that the processor 602 comprises: a feature point detecting unit 6022 for detecting a plurality of feature points of the first image and a plurality of feature points of the second image, respectively; a matching pair obtaining unit 6024 for matching the feature points of the first image and the feature points of the second image to obtain a plurality of feature point matching pairs; and an angle calculating unit 6026 for calculating the relative rotation angle according to the feature point matching pairs.

The present invention obtains related angles between the optical axes of the two cameras by computer vision technology. There are several ways to calculate the related angles. In a better embodiment, the feature points of the left and right images are detected, and the amount of the feature points can be preset. The feature points of the left and right images are then matched to obtain a plurality of matching pairs. The relative rotation angle can be calculated by using these matching pairs. The angle calculating procedure is performed by using images photographed by the left and right cameras without sensors, so that the error generated by the sensor can be avoided.

It is better in any one of the technical solutions above that the feature point detecting unit 6022 comprises: a pixel feature score calculating subunit 6022A and a feature selecting subunit 6022B, wherein the pixel feature score calculating subunit calculates a pixel feature score of each pixel in each of the images, and the feature selecting subunit selects a predetermined amount of pixels each with pixel feature score greater than a threshold to be the feature points of each of the images; and the matching pair obtaining unit 6024 comprises a matching subunit 6024A for matching each of the feature points of the first image with all the feature points in neighborhood of a position in the second image the same as the position where the matching feature point of the first image is, and selecting two feature points having a highest matching value as one of the feature point matching pairs.

It is necessary for calculating pixel feature score of each pixel and then selecting the pixel with pixel feature score greater than a threshold as a feature point when detecting the feature points of the image. That is, feature pixels are selected from each image such that calculation time needed thereafter can be reduced. After that, the feature points of the left and right images are matched and matching value (i.e. degree of matching) of each matching pairs is calculated. The higher the matching value is, the higher the possibility that the two feature points correspond to the same 3d point. The matching pair with high matching value is selected as the feature point matching pair such that calculation complexity and calculation time thereafter can be reduced as well.

It is better in any one of the technical solutions that the angle calculating unit 6026 comprises: a rotation matrix calculating subunit 6026A for calculating a rotation matrix of the two cameras whenever N feature point matching pairs are selected, and calculating an amount of outlier matching pairs corresponding to each rotation matrix and selecting the rotation matrix with least amount of outlier matching pairs as a finally determined rotation matrix of the two cameras; and a rotation angle calculating subunit 6026B for calculating a rotation angle on the x-axis, y-axis, and z-axis which the camera should be rotated relating to the other camera according to the finally determined rotation matrix, wherein N is a positive integer greater than or equals to 8.

After the feature point pairs are matched, a rotation matrix between the two cameras is calculated by using every eight matching pairs. For example, if there were eighty matching pairs, ten rotation matrices between the two cameras can be calculated. It can be repeated that eight feature point matching pairs are selected from the plural feature point matching pairs randomly, and therefore another ten rotation matrices can be obtained accordingly. The more the repeat is made, the more the rotation matrices are obtained. After that, a best rotation matrix is selected as the rotation matrix of the binocular camera. The selecting method is to calculate the amount of outlier matching pairs. The less the amount of outlier matching pairs are, the better the rotation matrix fits the relative rotation angle now of the binocular camera. Accordingly, the rotation matrix with least amount of outlier matching pairs is selected as the rotation matrix between the two cameras, and finally, the angle of optical axes of the two cameras in different directions can be calculated basing on the rotation matrix. Because the selected feature point matching pairs are combined randomly, a rotation matrix is calculated in accordance to each random combination, and adapted rotation matrix is finally selected there from in the present invention, the calculated rotation matrix is relatively precise and has an error much smaller than the sensing error of a sensor. Therefore, the calculated angle by computer vision technology is relatively precise and is with a measuring precision higher than that of manual resetting and sensor sensing resetting, such that the binocular camera can precisely reach the original position.

It is better in any one of the technical solutions above that the processor 602 further comprises: a corresponding relationship obtaining unit 6028 for obtaining a corresponding relationship between an image horizontal parallax and the spaced distance between the two cameras; a distance calculating unit 60210 for determining the spaced distance now between the two cameras according to the corresponding relationship and the image horizontal parallax now between the two cameras; and a decision unit 60212 for deciding whether the determined spaced distance between the two cameras corresponds to the preset distance between the two cameras when the two cameras are at the preset original position; if not, adjusting the spaced distance between the two cameras.

After calculating the relative rotation angle between the optical axes of the two cameras and performing the angle adjustment, the distance between the two cameras is adjusted to a preset distance. The corresponding relationship between the image horizontal parallax and the spaced distance between the two cameras should be obtained first when performing distance adjustment. After obtaining the corresponding relationship, the real distance now between the two cameras can be obtained according to the image horizontal parallax now between the two cameras. If the real distance between the two cameras is not the preset distance, the distance between the two cameras should be adjusted to the preset distance, or no adjustment is needed.

It is better in any one of the technical solution above that the corresponding relationship obtaining unit 6028 comprises: a first average parallax calculating subunit 6028A for photographing a left image and a right image by the two cameras respectively at a first time when the optical axes of the two cameras are parallel, and calculating a first average parallax between the left image and the right image at the first time; a second average parallax calculating subunit 6028B for controlling one of the two cameras to move a unit length in order to photograph the left image and the right image by the two cameras respectively at a second time, and calculating a second average parallax between the left image and the right image at the second time; and a corresponding relationship calculating subunit 6028C for obtaining the corresponding relationship according to relationship between an average parallax difference and the unit length, wherein the average parallax difference is difference between the first average parallax and the second average parallax.

There are many methods to obtain the corresponding relationship between the image horizontal parallax and the spaced distance between the two cameras, such as presetting or real-time measuring the corresponding relationship, wherein the method of real-time measuring is more precise since the effect of outside disturbances such as manual intervention can be avoid. When the two cameras are at a relative position, the horizontal parallax between the left and right images photographed at this time is calculated; then one of the two cameras moves a distance of a unit length, and the horizontal parallax between the left and right images photographed at this time is calculated. After that, the difference between the horizontal parallaxes after moving the distance of the unit length, i.e. the difference of horizontal parallax corresponding to the distance of one unit length, is determined.

The real distance between the two cameras is indirectly determined according to the image horizontal parallax by using the corresponding relationship between the distance between the two cameras and the image horizontal parallax. It is not necessary to determine whether the distance between the two cameras corresponds to a requirement by directly measuring the distance between the two cameras. Because the image horizontal parallax is calculated according to the feature points of the images photographed by the two cameras, the calculated result is more precise than the real distance between the two cameras measured by measure tools.

It is better in any one of the technical solutions above that the corresponding relationship obtaining unit 6028 comprises: a first parallax calculating unit for detecting a plurality of feature points of the left image and the right image at the first time, matching the feature points of the left image and the feature points of the right image to obtain a plurality of matching pairs, and calculating a parallax of each matched pairs to obtain the first average parallax at the first time; and a second parallax calculating unit for detecting a plurality of feature points of the left image and the right image at the second time, matching the feature points of the left image and the feature points of the right image to obtain a plurality of matching pairs, and calculating a parallax of each matched pairs to obtain the second average parallax at the second time.

There are still many methods to calculate the horizontal parallax between the left and right images. A better method is like the method of calculating the rotation angle between the optical axes of the cameras: detecting feature points of left and right images, matching the feature points of left and right images to obtain a plurality of matching pairs, calculating horizontal parallax of each matching pair, and averaging the calculated horizontal parallaxes to obtain the average horizontal parallax.

It is better in any one of the technical solutions above that the processor 602 further comprises: a checking unit 60214. The checking unit 60214 is charged to ensure that the determined parallax of the corresponded matching pair is errorless and the first average parallax and the second average parallax are calculated according to the errorless parallax by satisfying the following condition: the feature points of the left image at the first time are matched with the feature points of the left image at the second time, or the feature points of the right image at the first time are matched with the feature points of the right image at the second time.

In order to further determine whether there is error in the horizontal parallax in each matching pair, the method mentioned above can be applied. If a feature point in the left image at the first time matches one feature point in the left image at the second time, and this feature point, which is in the left image at the second time, matches one feature point in the right image at the second time, the horizontal parallax corresponding to the matching pair is decided to be errorless. Calculating the average horizontal parallax according to the errorless horizontal parallax increases the precision of the calculated average horizontal parallax for improving the degree of calculation precision of the spaced distance between the cameras such that the binocular camera is capable of being at the precision original position.

It is better in any one of the technical solution above that the processor 602 further sends a reset command to the controller 604 while receiving a triggering signal of a reset switch; the controller 604 further sends a third control signal to the two driving units (606A and 606B) while receiving the reset command; each of the driving units further drives the corresponding camera for completing the rough adjustment while receiving the third control signal; wherein each of the driving unit comprises: a first driving motor for driving the two cameras to corresponding original positions respectively while receiving a reset command, and driving the two cameras to move the preset distance in opposite direction respectively after the two cameras reach the corresponding original positions respectively; and a second driving motor for driving the two cameras to rotate a preset angle after the two cameras reach the corresponding original positions respectively.

The proposed solution utilizes automatic resetting during the rough adjustment to complete the rough adjustment by using motors to drive the two cameras when sending resetting command. A fine adjustment method provided by the present invention is utilized after the rough adjustment of the two cameras is completed respectively. The binocular camera can be at the precision original position after users trigger the resetting switch without manual operation participating in the middle process such that the effect of one key resetting can be achieved.

Figure 7:
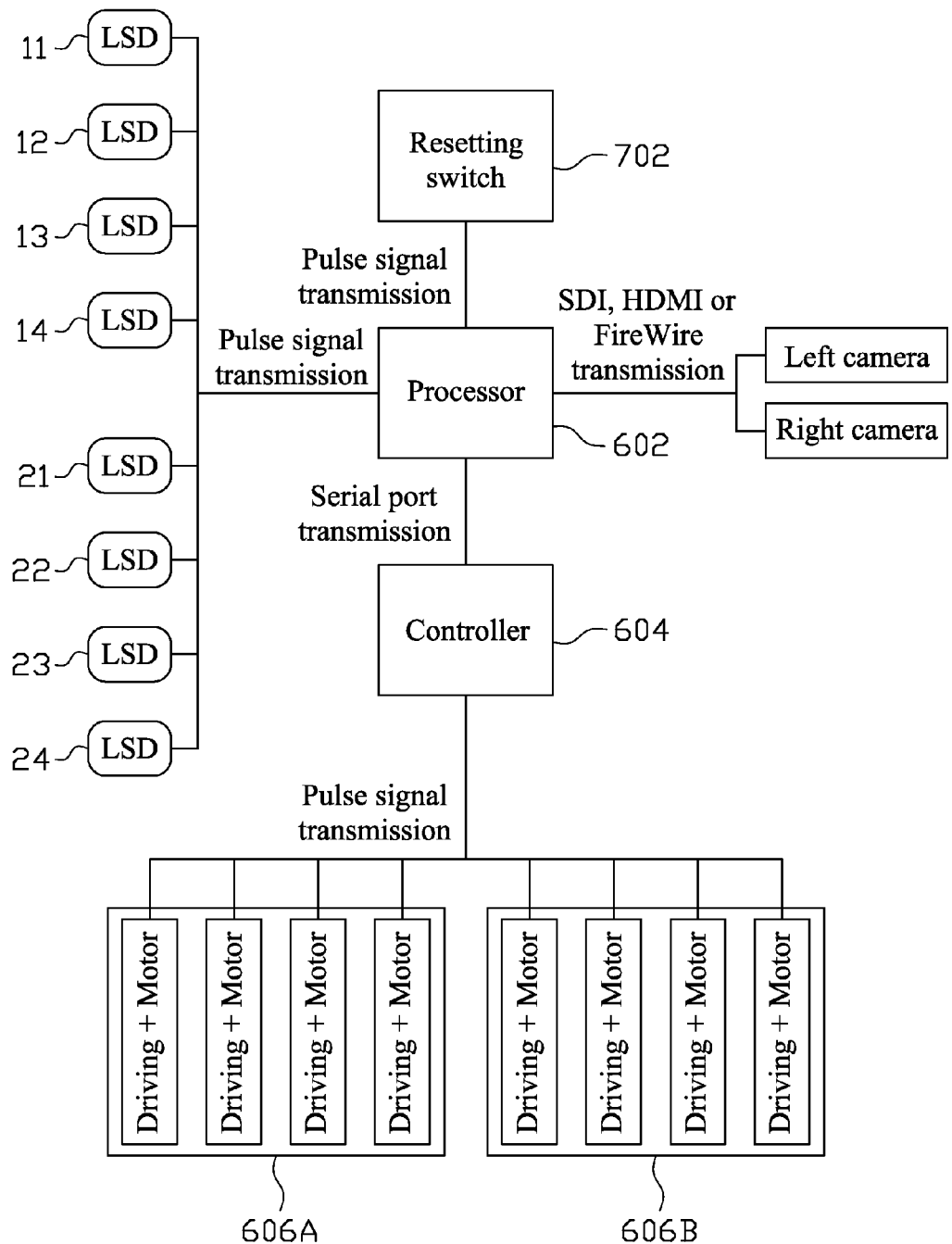
FIG. 7 illustrates a schematic diagram of the binocular camera resetting apparatus according to another embodiment of the present invention.

FIG. 7 is combined in order to further describe the binocular camera resetting apparatus according to the present invention as below.

The main part in the binocular camera resetting apparatus: the processor 602, is the superior machine. The superior machine could be a Micro-processor, a computer basing on the Central Processing Unit, a Field-Programmable Gate Array, or a Programmable Logic Device. Besides, because of applying computer vision technology in the embodiment of the present invention, the equipment such as Digital Signal Processor or Graphic Processing Unit is added into the processor 602 for improving image processing speed.

The binocular camera resetting apparatus further comprises a resetting signal receiver (i.e. resetting switch 702), a Programmable Logical Controller PCL (i.e. controller 604), sensor sets, a motor driver and motor sets. Wherein, each camera corresponds to a driving unit, for example, the left camera corresponds to the driving unit 606A and the right camera corresponds to the driving unit 606B. Each driving unit comprises a motor for controlling horizontal move and three motors for controlling the camera to rotate in different directions respectively. Besides, each camera owns a sensor set on one terminal of the camera supporting rod and three sensors set on the camera, i.e. each camera owns four sensors, for example the left camera corresponds to the sensors LSD11 to LSD14 (wherein, LSD11 is used for detecting whether the camera is at the original position, and LSD12, LSD13 and LSD14 are used for detecting the rotation angles of the camera in three directions (x, y and z), respectively, and the right camera corresponds to the sensors LSD21 to LSD24. The controller 604 communicates with the processor 602 through a serial port. The communication between the processor 602 and the cameras is determined according to the output signal of the left camera and right camera, and could be transmitted in format of SDI, HDMI or Firewire. Besides, the signals between the resetting switch 702 and the processor 602, between the sensors and the processor 602, and between the driving units and the controller 604 are transmitted by pulse signals.

The schematic diagram of the equipment relating to the rough adjustment of the camera is described below in combination with FIGS. 8A to 8D. Wherein, FIGS. 8A to 8C describe the schematic diagram of the equipment relating to the rough adjustment on rotation, and FIG. 8D describes the schematic diagram of the equipment relating to the rough adjustment on horizontal moving.

Figure 8A:
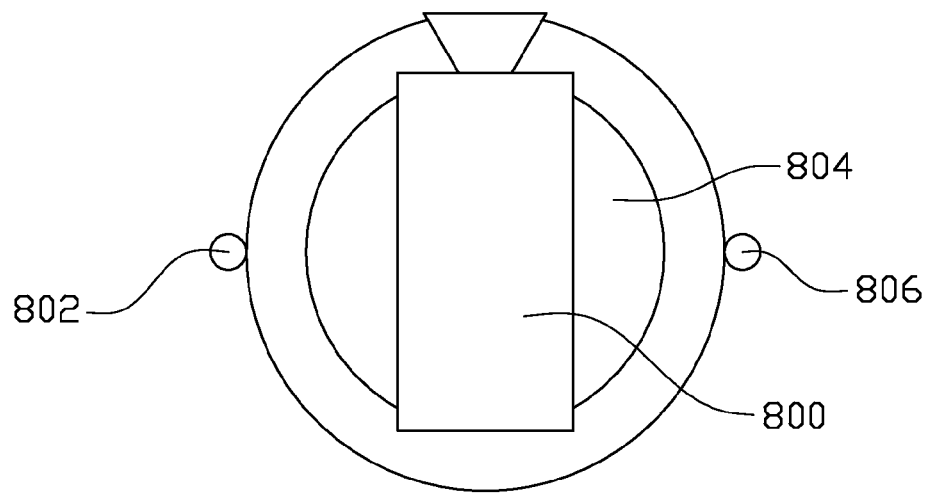
FIG. 8A illustrates a top view of the related equipment when performing angle rough adjustment on the binocular camera according to one embodiment of the present invention.
Figure 8B:
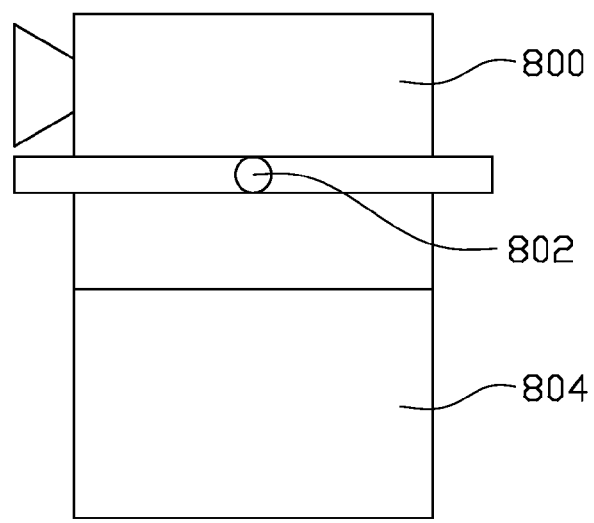
FIG. 8B illustrates a left view of the related equipment when performing angle rough adjustment on the binocular camera according to one embodiment of the present invention.
Figure 8C:
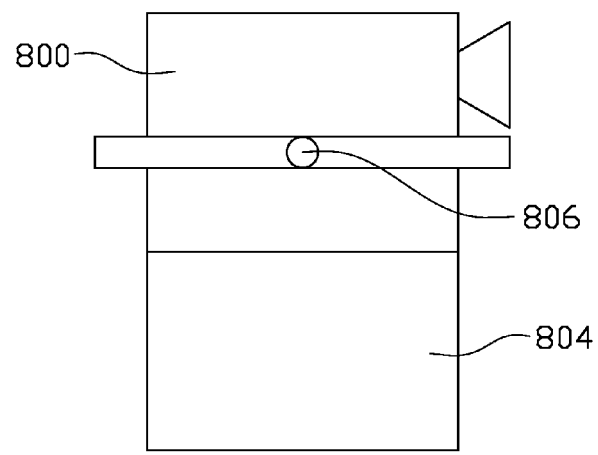
FIG. 8C illustrates a right view of the related equipment when performing angle rough adjustment on the binocular camera according to one embodiment of the present invention.

As illustrated in FIG. 8A, it is a top view of the camera equipment. An original position switch (sensor) 802 is set on the position opposite to the original position of the camera. When the rough adjustment is performed, motor 804 moves the camera 800 first to the original position where the original position switch 802 is, and then controls the camera 800 to rotate a known angle, which is the relative angle between the starting position 806 and the original position, to reach the starting position 806. Because this is the rough adjustment, the camera 800 does not really reach the starting position 806 but a further fine adjustment is needed. FIG. 8B and FIG. 8C are two side views illustrating the structure of the camera equipment in different directions.

Figure 8D:
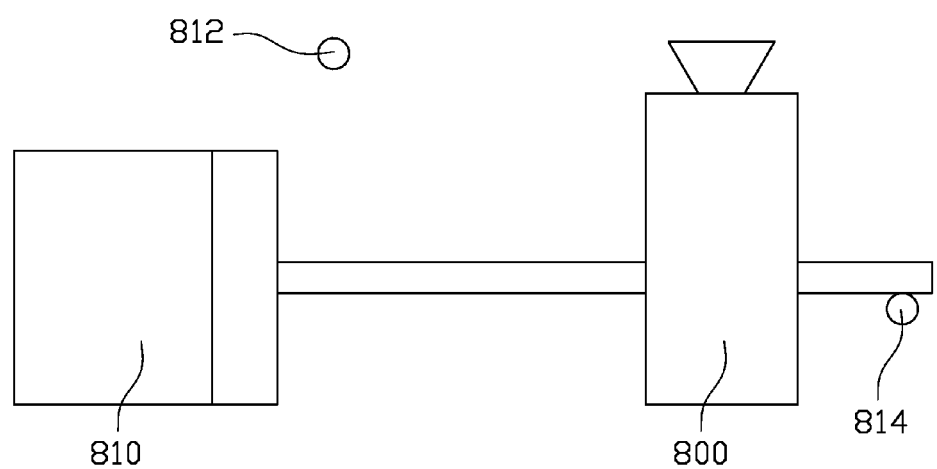
FIG. 8D illustrates a schematic diagram of the related equipment when performing horizontal displacement rough adjustment on the binocular camera according to one embodiment of the present invention.

As illustrated in FIG. 8D, a schematic diagram of the equipment relating to the rough adjustment on horizontal moving is shown. In the figure, the original position switch 812 is at the original position, which is different from the original position in FIG. 8C, of the horizontal moving. First, the motor 810 drives the camera 800 to reach the position where the original position switch 812 is, and then moves the camera 800 for a known distance (the known distance is the distance between the original position and the starting position 814) such that the camera 800 reaches the starting position 814. Because this is the rough adjustment, the camera 800 does not really reach the starting position 814 but a further fine adjustment is needed. The further fine adjustment has been described above and is not repeated here.

The technical solution according to the present invention, which provides a binocular camera automatic resetting method and apparatus basing on computer vision technology, is described in detail above combining with the drawings. Comparing to the method of conventional manual resetting, the method is beneficial in time saving and high precision. Besides, the computer vision technology is applied in the present invention to calculate the rotation angle and real distance for horizontal moving between the two cameras such that the precisely resetting for the movable binocular camera can be achieved without using the expensive equipment such as a distance measuring sensor. The camera automatically completes the mission of resetting once the photographer sending out the reset command, and the nimbleness of the camera resetting is improved.

Those described above is the better embodiments of the present invention and is not for limiting the present invention. There could be various modifications and variations for those with ordinary skill in the art. Any modification, equivalent replacement and improvement within the spirit and principle of the present invention should be included in the protection scope of the present invention.

What is claimed is:
1. A binocular camera resetting method, comprising:
obtaining a first image and a second image photographed by two cameras at the same time respectively after completing a rough adjustment of the two cameras;
calculating a relative rotation angle between optical axes of the two cameras using a plurality of feature points of the first image acquired by one of the two cameras and the feature points of the second image acquired by the other one of the two cameras;
controlling one of the two cameras to rotate the relative rotation angle to parallelize the optical axes of the rotated camera and the other camera; and
adjusting a spaced distance between the two cameras to a preset distance in order to ensure that the two cameras are at a preset original position after parallelizing the optical axes of the two cameras,
wherein calculating the relative rotation angle between optical axes of the two cameras using the feature points of the first image acquired by one of the two cameras and the feature points of the second image acquired by the other one of the two cameras, further comprises:
detecting a plurality of feature points of the first image and a plurality of feature points of the second image, respectively;
matching the feature points of the first image and the feature points of the second image to obtain a plurality of feature point matching pairs; and
calculating the relative rotation angle according to the feature point matching pairs,
wherein calculating the relative rotation angle according to the feature point matching pairs comprises:
calculating a rotation matrix of the two cameras whenever N feature point matching pairs are selected, wherein N is a positive integer greater than or equals to 8;
calculating an amount of outlier matching pairs corresponding to each rotation matrix; selecting the rotation matrix with least amount of outlier matching pairs as a finally determined rotation matrix of the two cameras; and
calculating a rotation angle on the x-axis, y-axis, and z-axis which the camera should be rotated relating to the other camera according to the finally determined rotation matrix.

2. A binocular camera resetting method, comprising:
obtaining a first image and a second image photographed by two cameras at the same time respectively after completing a rough adjustment of the two cameras;
calculating a relative rotation angle between optical axes of the two cameras using a plurality of feature points of the first image acquired by one of the two cameras and the feature points of the second image acquired by the other one of the two cameras;
controlling one of the two cameras to rotate the relative rotation angle to parallelize the optical axes of the rotated camera and the other camera; and
adjusting a spaced distance between the two cameras to a preset distance in order to ensure that the two cameras are at a preset original position after parallelizing the optical axes of the two cameras,
wherein adjusting the spaced distance between the two cameras to the preset distance comprises:
obtaining a corresponding relationship between an image horizontal parallax and the spaced distance between the two cameras;
determining the spaced distance now between the two cameras according to the corresponding relationship and the image horizontal parallax now between the two cameras; and
deciding whether the determined spaced distance between the two cameras corresponds to the preset distance between the two cameras when the two cameras are at the preset original position; if not, adjusting the spaced distance between the two cameras,
wherein obtaining the corresponding relationship between the image horizontal parallax and the spaced distance between the two cameras comprises:
photographing a left image and a right image by the two cameras respectively at a first time when the optical axes of the two cameras are parallel, and calculating a first average parallax between the left image and the right image at the first time;
controlling one of the two cameras to move a unit length in order to photograph the left image and the right image by the two cameras respectively at a second time, and calculating a second average parallax between the left image and the right image at the second time; and
obtaining the corresponding relationship according to relationship between an average parallax difference and the unit length, wherein the average parallax difference is difference between the first average parallax and the second average parallax.

3. The binocular camera resetting method according to claim 2, wherein calculating average parallax between the left image and the right image comprises:
detecting a plurality of feature points of the left image and the right image at the first time, matching the feature points of the left image and the feature points of the right image to obtain a plurality of matching pairs, and calculating a parallax of each matched pairs to obtain the first average parallax at the first time; and
detecting a plurality of feature points of the left image and the right image at the second time, matching the feature points of the left image and the feature points of the right image to obtain a plurality of matching pairs_at the second time, and calculating a parallax of each matched pairs at the second time to obtain the second average parallax at the second time;
wherein the parallax of the corresponded matching pair is errorless and the first average parallax and the second average parallax are calculated according to the errorless parallax by satisfying the following condition:
the feature points of the left image at the first time are matched with the feature points of the left image at the second time, or the feature points of the right image at the first time are matched with the feature points of the right image at the second time.

4. A binocular camera resetting apparatus, which is characterized in comprising:
a processor, connecting to a controller, and obtaining a first image and a second image photographed by two cameras at the same time respectively after a rough adjustment of the two cameras is completed, calculating a relative rotation angle between the two cameras using a plurality of feature points of the first image acquired by one of the two cameras and the feature points of the second image acquired by the other one of the two cameras and sending an angle control command to the controller, and obtaining a spaced distance between the two cameras and sending a distance control command to the controller;
the controller, connecting to two driving units, and sending the angle control command to the two driving units while receiving the angle control command, and sending the distance control command to the two driving units while receiving the distance control command; and
the two driving unit, connecting to the two cameras respectively, and controlling one of the two cameras to rotate the relative rotation angle to parallelize the optical axes of the rotated camera and the other camera while receiving the angle control command, and, while receiving the distance control command, adjusting a spaced distance between the two cameras to a preset distance in order to ensure that the two cameras are at a preset original position,
wherein the processor comprises:
a corresponding relationship obtaining unit for obtaining a corresponding relationship between an image horizontal parallax and the spaced distance between the two cameras;
a distance calculating unit for determining the spaced distance now between the two cameras according to the corresponding relationship and the image horizontal parallax now between the two cameras; and
a decision unit for deciding whether the determined spaced distance between the two cameras corresponds to the preset distance between the two cameras when the two cameras are at the preset original position; if not, adjusting the spaced distance between the two cameras,
wherein the corresponding relationship obtaining unit comprises:
a first average parallax calculating subunit for photographing a left image and a right image by the two cameras respectively at a first time when the optical axes of the two cameras are parallel, and calculating a first average parallax between the left image and the right image at the first time;
a second average parallax calculating subunit for controlling one of the two cameras to move a unit length in order to photograph the left image and the right image by the two cameras respectively at a second time, and calculating a second average parallax between the left image and the right image at the second time; and a corresponding relationship calculating subunit for obtaining the corresponding relationship according to relationship between an average parallax difference and the unit length, wherein the average parallax difference is difference between the first average parallax and the second average parallax.

5. The binocular camera resetting apparatus according to claim 4, wherein the corresponding relationship obtaining unit comprises:

a first parallax calculating unit for detecting a plurality of feature points of the left image and the right image at the first time, matching the feature points of the left image and the feature points of the right image to obtain a plurality of matching pairs, and calculating a parallax of each matched pairs to obtain the first average parallax at the first time; and a second parallax calculating unit for detecting a plurality of feature points of the left image and the right image at the second time, matching the feature points of the left image and the feature points of the right image to obtain a plurality of matching pairs at the second time, and calculating a parallax of each matched pairs at the second time to obtain the second average parallax at the second time;

wherein the processor further comprises a checking unit wherein the checking unit is charged to ensure that the parallax of the corresponded matching pair is errorless and the first average parallax and the second average parallax are calculated according to the errorless parallax by satisfying the following condition:

the feature points of the left image at the first time are matched with the feature points of the left image at the second time, or the feature points of the right image at the first time are matched with the feature points of the right image at the second time.

6. The binocular camera resetting method according to claim 1, wherein detecting the feature points of the first image and the feature points of the second image comprises:

calculating a pixel feature score of each pixel in each of the images; and selecting a predetermined amount of pixels each with pixel feature score greater than a threshold to be the feature points of each of the images;

wherein matching the feature points of the first image and the feature points of the second image comprises:

matching each of the feature points of the first image with all the feature points in neighborhood of a position in the second image the same as the position where the matching feature point of the first image is; and selecting two feature points having a highest matching score as one of the feature point matching pairs.

7. The binocular camera resetting method according to claim 1, wherein adjusting the spaced distance between the two cameras to the preset distance comprises:

obtaining a corresponding relationship between an image horizontal parallax and the spaced distance between the two cameras;

determining the spaced distance now between the two cameras according to the corresponding relationship and the image horizontal parallax now between the two cameras; and deciding whether the determined spaced distance between the two cameras corresponds to the preset distance between the two cameras when the two cameras are at the preset original position; if not, adjusting the spaced distance between the two cameras.

8. The binocular camera resetting method according to claim 1, wherein completing the rough adjustment of the two cameras comprises:

driving the two cameras to corresponding original positions respectively while receiving a reset command; and driving the two cameras to rotate a preset angle and to move the preset distance in opposite direction respectively after the two cameras reach the corresponding original positions respectively.

9. The binocular camera resetting method according to claim 2, wherein calculating the relative rotation angle between optical axes of the two cameras using the feature points of the first image acquired by one of the two cameras and the feature points of the second image acquired by the other one of the two cameras, further comprises:

detecting a plurality of feature points of the first image and a plurality of feature points of the second image, respectively;

matching the feature points of the first image and the feature points of the second image to obtain a plurality of feature point matching pairs; and calculating the relative rotation angle according to the feature point matching pairs.

10. The binocular camera resetting method according to claim 9, wherein detecting the feature points of the first image and the feature points of the second image comprises:

calculating a pixel feature score of each pixel in each of the images; and selecting a predetermined amount of pixels each with pixel feature score greater than a threshold to be the feature points of each of the images; wherein matching the feature points of the first image and the feature points of the second image comprises:

matching each of the feature points of the first image with all the feature points in neighborhood of a position in the second image the same as the position where the matching feature point of the first image is; and selecting two feature points having a highest matching score as one of the feature point matching pairs.

11. The binocular camera resetting method according to claim 9, wherein calculating the relative rotation angle according to the feature point matching pairs comprises:

calculating a rotation matrix of the two cameras whenever N feature point matching pairs are selected, wherein N is a positive integer greater than or equals to 8;

calculating an amount of outlier matching pairs corresponding to each rotation matrix; selecting the rotation matrix with least amount of outlier matching pairs as a finally determined rotation matrix of the two cameras; and calculating a rotation angle on the x-axis, y-axis, and z-axis which the camera should be rotated relating to the other camera according to the finally determined rotation matrix.

12. The binocular camera resetting method according to claim 2, wherein completing the rough adjustment of the two cameras comprises:

driving the two cameras to corresponding original positions respectively while receiving a reset command; and driving the two cameras to rotate a preset angle and to move the preset distance in opposite direction respectively after the two cameras reach the corresponding original positions respectively.

13. The binocular camera resetting apparatus according to claim 4, wherein the processor comprises:
   a feature point detecting unit for detecting a plurality of feature points of the first image and a plurality of feature points of the second image, respectively;
   a matching pair obtaining unit for matching the feature points of the first image and the feature points of the second image to obtain a plurality of feature point matching pairs; and
   an angle calculating unit for calculating the relative rotation angle according to the feature point matching pairs.

14. The binocular camera resetting apparatus according to claim 13, wherein the feature point detecting unit comprises:
   a pixel feature score calculating subunit and a feature selecting subunit, wherein the pixel feature score calculating subunit calculates a pixel feature score of each pixel in each of the images, and the feature selecting subunit selects a predetermined amount of pixels each with pixel feature score greater than a threshold to be the feature points of each of the images; and
   the matching pair obtaining unit comprises a matching subunit for matching each of the feature points of the first image with all the feature points in neighborhood of a position in the second image the same as the position where the matching feature point of the first image is, and selecting two feature points having a highest matching score as one of the feature point matching pairs.

15. The binocular camera resetting apparatus according to claim 13, wherein the angle calculating unit comprises:
   a rotation matrix calculating subunit for calculating a rotation matrix of the two cameras whenever N feature point matching pairs are selected, and calculating an amount of outlier matching pairs corresponding to each rotation matrix and selecting the rotation matrix with least amount of outlier matching pairs as a finally determined rotation matrix of the two cameras; and
   a rotation angle calculating subunit for calculating a rotation angle on the x-axis, y-axis, and z-axis which the camera should be rotated relating to the other camera according to the finally determined rotation matrix, wherein N is a positive integer greater than or equals to 8.

16. The binocular camera resetting apparatus according to claim 4, wherein the processor further sends a reset command to the controller while receiving a triggering signal of a reset switch;
   the controller further sends a third control signal to the two driving units while receiving the reset command;
   each of the driving units further drives the corresponding camera for completing the rough adjustment while receiving the third control signal;
   wherein each of the driving unit comprises:
      a first driving motor for driving the two cameras to corresponding original positions respectively while receiving a reset command, and driving the two cameras to move the preset distance in opposite direction respectively after the two cameras reach the corresponding original positions respectively; and
      a second driving motor for driving the two cameras to rotate a preset angle after the two cameras reach the corresponding original positions respectively.

* * * * *